United States Patent
Lu et al.

(10) Patent No.: US 11,071,090 B2
(45) Date of Patent: Jul. 20, 2021

(54) METHOD AND APPARATUS FOR TRANSMITTING SYNCHRONIZATION SIGNAL, METHOD AND APPARATUS FOR RECEIVING SYNCHRONIZATION SIGNAL

(71) Applicant: ZTE CORPORATION, Guangdong (CN)

(72) Inventors: Zhaohua Lu, Guangdong (CN); Yijian Chen, Guangdong (CN); Guanghui Yu, Guangdong (CN); Yu Ngok Li, Guangdong (CN); Peng Hao, Guangdong (CN); Weida Wang, Guangdong (CN); Yong Yu, Guangdong (CN)

(73) Assignee: ZTE Corporation, Guangdong (CN)

( * ) Notice: Subject to any disclaimer, the term of this patent is extended or adjusted under 35 U.S.C. 154(b) by 120 days.

(21) Appl. No.: 16/312,930

(22) PCT Filed: Jun. 12, 2017

(86) PCT No.: PCT/CN2017/087913
§ 371 (c)(1),
(2) Date: Dec. 21, 2018

(87) PCT Pub. No.: WO2017/219888
PCT Pub. Date: Dec. 28, 2017

(65) Prior Publication Data
US 2019/0223155 A1  Jul. 18, 2019

(30) Foreign Application Priority Data

Jun. 23, 2016 (CN) .......................... 201610465503.5

(51) Int. Cl.
*H04W 72/00* (2009.01)
*H04W 56/00* (2009.01)
*H04L 5/00* (2006.01)

(52) U.S. Cl.
CPC ......... *H04W 72/005* (2013.01); *H04L 5/0032* (2013.01); *H04W 56/00* (2013.01); *H04W 56/001* (2013.01)

(58) Field of Classification Search
CPC .. H04L 5/0032; H04W 56/00; H04W 56/001; H04W 72/005
See application file for complete search history.

(56) References Cited

U.S. PATENT DOCUMENTS 10,284,320 B2 * 5/2019 Frenne ................ H04L 27/2613
10,313,990 B2 * 6/2019 Sadeghi ................ H04L 5/0053
(Continued)

FOREIGN PATENT DOCUMENTS

| CN | 103828398 A | 5/2014 |
| CN | 104219757 A | 12/2014 |

(Continued)

OTHER PUBLICATIONS

Extended European Search Report of corresponding Patent Application No. 17814626.2—9 pages (dated Jan. 3, 2020).
(Continued)

*Primary Examiner* — Chi H Pham
*Assistant Examiner* — Weibin Huang
(74) *Attorney, Agent, or Firm* — Knobbe, Martens, Olson & Bear, LLP

(57) ABSTRACT

Provided are a method and apparatus for transmitting a synchronization signal, and a method and apparatus for receiving the synchronization signal. The method for transmitting the synchronization signal includes: determining, by a transmitting end, the synchronization signal, transmitting, by the transmitting end, the synchronization signal determined to a receiving end, and notifying the receiving end of configuration information related to the synchronization signal determined.

13 Claims, 8 Drawing Sheets

(56) References Cited

U.S. PATENT DOCUMENTS

| | | | |
|---|---|---|---|
| 2016/0308637 A1 | 10/2016 | Frenne et al. | |
| 2016/0374038 A1* | 12/2016 | Wang | H04W 72/0466 |
| 2017/0150461 A1* | 5/2017 | Li | H04L 27/2662 |
| 2018/0176065 A1* | 6/2018 | Deng | H04B 7/088 |
| 2019/0028222 A1 | 1/2019 | Frenne et al. | |

FOREIGN PATENT DOCUMENTS

| | | |
|---|---|---|
| CN | 104812049 A | 7/2015 |
| WO | 2013155978 A1 | 10/2013 |
| WO | 2015/080646 A1 | 6/2015 |
| WO | 2016069144 A1 | 5/2016 |
| WO | 2016091223 A1 | 6/2016 |
| WO | 2016/210302 A1 | 12/2016 |

OTHER PUBLICATIONS

International Search Report dated Sep. 11, 2017 for International Application No. PCT/CN2017/087913, 5 pages.
Written Opinion of the International Searching Authority dated Sep. 11, 2017 for International Application No. PCT/CN2017/087913, 5 pages.

* cited by examiner

FIG. 7

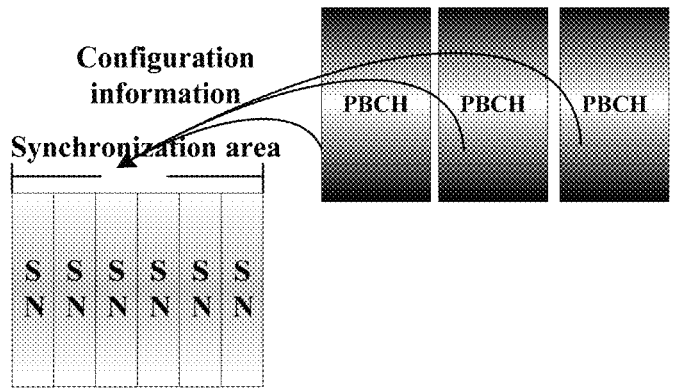
FIG. 11
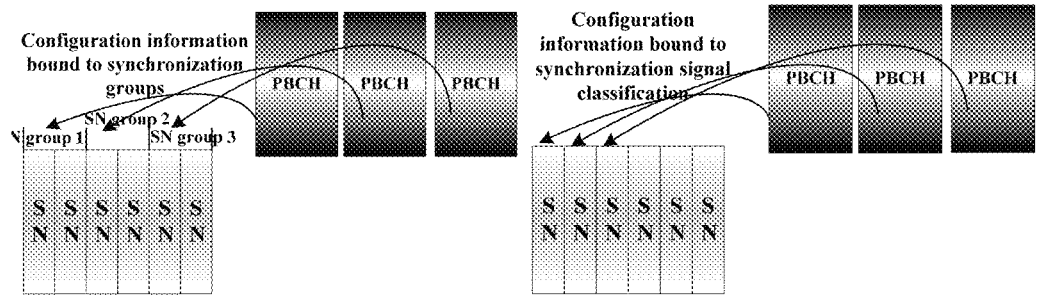
FIG. 12
Determine, by a receiving end, configuration information transmitted from a transmitting end, where the configuration information is related to the synchronization signal transmitted from the transmitting end — S1302
Acquire the synchronization signal by the receiving end according to the configuration information — S1304
FIG. 13

METHOD AND APPARATUS FOR TRANSMITTING SYNCHRONIZATION SIGNAL, METHOD AND APPARATUS FOR RECEIVING SYNCHRONIZATION SIGNAL

CROSS REFERENCE TO RELATED APPLICATIONS

This is the U.S. National Stage Application under 35 U.S.C. 371 of International Patent Application No. PCT/CN2017/087913, filed on Jun. 12, 2017, which claims priority to Chinese Patent Application No. 201610465503.5 filed on Jun. 23, 2016, the entire disclosure of each of which is incorporated herein by reference.

TECHNICAL FIELD

The present disclosure relates to the field of communications and, in particular, to a method and an apparatus for transmitting a synchronization signal, and a method and an apparatus for receiving the synchronization signal.

BACKGROUND

An important basic problem in communication systems is synchronization. A primary function of synchronization is to achieve the synchronization on communication time and frequency domain (a multi-carrier system), so that a peer end to be synchronized (which may be a base station, and may also be a terminal which will be used as an example hereinafter) may correctly receive various physical layer channels and signals. During a process of synchronization detection, other necessary information may also be acquired. For example, a physical-layer cell identity (PCI) may be notified. In 4G long-term evolution (LTE), since the LTE is mainly operated at low frequency, synchronization signal of the physical layer is transmitted over a wider range in space domain and is divided into primary synchronization signal (PSS) and secondary synchronization signal (SSS). The primary synchronization signal is mainly used for achieving time domain synchronization and frequency domain synchronization at sub-frame level. When sending, the base station adopts a 62-bit Zadoff-Chu (ZC) sequence with three selectable root sequences. Since enough spreading gain is provided and a path loss of low-frequency transmission is not large, requirements of 4G can be met. The secondary synchronization signal may be used to further achieving synchronization at radio frame level, so as to obtain sub-frame number and further acquire ID of a physical cell.

When the terminal is powered on, since the terminal fails to obtain information related to bandwidth, a duplex mode and the number of antennas before the detection of the synchronization signal, the synchronization signal is transmitted through a relatively fixed transmission mode. When being powered on, a user equipment (UE) (also be referred to as a terminal) fails to know the bandwidth of a cell system and only knows a frequency band and bandwidth supported by the terminal (for details, see 36.101). To enable the UE to detect frequency and symbol synchronization information of the system as soon as possible, no matter what size of the bandwidth of a downlink system is, the PSS and the SSS are both located on 72 subcarriers in the center (that is, six resource blocks (RB) in the center), excluding direct current component (DC). In practice, only 62 subcarriers around a frequency center DC are used, and 5 subcarriers are reserved as a protection band on each side. The UE will try to receive the PSS and SSS near a center frequency point of LTE frequency supported by the UE. Since the terminal fails to obtain configuration information related to the subframe, for a duplex mode, a time domain position of the PSS/SSS and Physical Broadcast Channel (PBCH) is fixedly configured, as shown in FIG. 1. Details of basic processes and steps of the synchronization in the LTE may refer to FIG. 2.

A new-generation 5G mobile communication system will perform system networking at a carrier frequency higher than those used in 2G, 3G and 4G systems. Currently, frequency bands which are widely recognized in the industry and by international organizations are mainly 3 GHz-6 GHz and 6 GHz-100 GHz. These frequency bands substantially belong to a centimeter band or a millimeter band, and the propagation characteristics of these frequency bands are significantly different from those of lower frequency bands. Since the propagation loss of higher frequency bands is significantly higher than that of lower frequency bands, a coverage range of higher frequency bands is generally much smaller than that of lower frequency bands. To enlarge the coverage range of higher frequency bands, a beamforming technology is generally adopted when transmitting, so that energy of the radio signal is narrowed and concentrated on devices required to communicate with each other. For the synchronization signal, through some calculations and analyses, it is considered that a narrow beam is required to effectively combat the very large path loss, so that the SINR at a receiving end satisfies the coverage requirements of the synchronization.

After a radio frequency beam is introduced into the synchronization process, instead of covering a whole cell with synchronization signal that needs only one wide beam, synchronization signal that needs multiple narrow beams is transmitted, as shown in FIG. 3.

Compared with the wide beam synchronization signal coverage technology, a new dimension (i.e., space domain) is introduced in the narrow beam synchronization signal coverage technology, where the number of beams is N (N is an integer greater than 1). In this case, the beam-based synchronization signal faces with following challenges: since many beams formed are radio frequency beams when the number of antennas is large, different radio frequency beams formed through the same transmitting channel fail to be space division multiplexed and frequency division multiplexed; and values of N are not fixed with respect to different coverage and different beam widths, which brings great difficulty to the detection of the synchronization signal.

In the related art, different radio frequency beams are mainly time division multiplexed, that is, different radio frequency beams are transmitted on different time domain symbols. If the radio frequency beams are used for the synchronization signal, instead of transmitting synchronization signal with the wide beam, synchronization signal with multiple narrow beams are transmitted. In this case, as for different number of beams, different time domain resources are occupied. However, in the related art, since the terminal has not completed the access, it fails to notify information about the value N of the number of related radio beams when synchronizing. Therefore, in the related art, a constant value N is adopted, which greatly limits the flexibility of the synchronization, thereby affecting the performance of the synchronization and coverage of the synchronization signal.

No effective solution has yet been proposed for the above problem in the related art.

SUMMARY

Embodiments of the present disclosure provide a method and an apparatus for a transmitting synchronization signal, and a method and apparatus for receiving the synchronization signal, so that at least a problem in the related art, where the performance of the synchronization and coverage of the synchronization signal are affected due to the low flexibility of the synchronization, can be solved.

An embodiment of the present disclosure provides a method for transmitting a synchronization signal. The method includes: determining, by a transmitting end, the synchronization signal; transmitting, by the transmitting end, the synchronization signal determined to a receiving end, and notifying, by the transmitting end, the receiving end of configuration information related to the synchronization signal determined.

In an exemplary embodiment, the determining, by a transmitting end, the synchronization signal includes: determining, by the transmitting end, X synchronization signal groups, wherein each of the X synchronization signal groups comprises a respective one of $N_1, N_2, \ldots N_x$ types of downlink synchronization signals corresponding to transmission configuration, X is an integer greater than or equal to 1, $N_1, N_2, \ldots N_x$ are all integers greater than or equal to 1 and a sum Ntot of a total number of classifications of the downlink synchronization signals included in the X synchronization signal groups equals to $N_1+N_2+ \ldots +N_x$.

In an exemplary embodiment, the notifying, by the transmitting end, the receiving end of configuration information related to the synchronization signal determined includes: notifying, by the transmitting end, the receiving end of the configuration information related to the synchronization signal determined in at least one of the following manners: indicating the configuration information through signaling in a physical broadcast channel; indicating the configuration information through higher layer configuration signaling; indicating the configuration information through a sequence group to which a sequence of the synchronization signal belongs; indicating the configuration information through signaling on another cell other than a cell corresponding to the synchronization signal; indicating the configuration information through signaling on another sector other than a sector corresponding to the synchronization signal; indicating the configuration information through signaling on another carrier frequency other than a carrier frequency corresponding to the synchronization signal; indicating the configuration information through signaling on a transmission node other than the transmitting end; indicating the configuration information through a frequency domain mapping of the synchronization signal; and indicating the configuration information through a time domain mapping of the synchronization signal.

In an exemplary embodiment, the X synchronization signal groups correspond to at least one of the followings: X transmission antenna groups; X reception antenna groups; and X antenna group pairs composed of the transmission antenna group and the reception antenna group.

In an exemplary embodiment, the configuration information includes basic configuration information and/or resource configuration information. at least one of the followings is met in the method: the basic configuration information comprises at least one parameter of a group consisting of: Ntot, $N_1, N_2, \ldots N_x$ and X; the resource configuration information comprises at least one parameter of a group consisting of: a sequence resource allocation parameter, a beam resource allocation parameter, a time domain resource parameter, a frequency domain resource parameter, a power resource parameter and a transmission sector resource; the resource configuration information includes index information about a resource group occupied by the synchronization signal; the resource configuration information comprises resource allocation information about part or all of the synchronization signal groups; and the resource configuration information comprises resource allocation information about one or more types of the synchronization signals.

In an exemplary embodiment, the power resource parameter is represented by offset information about a relative power between the synchronization signals, or offset information about the relative power between the synchronization signal and a physical broadcast channel.

In an exemplary embodiment, a size of the resource group, which is occupied by each type of synchronization signal in each group of the X synchronization signal groups, is determined by at least one parameter of a group consisting of: $N_{tot}, N_1, N_2, \ldots N_x$ and X.

In an exemplary embodiment, resource classifications corresponding to the resource allocation information includes at least one of: a beam resource, a sequence resource, a time domain resource, a frequency domain resource, a power resource and a transmission sector resource.

In an exemplary embodiment, the transmitting, by the transmitting end, the synchronization signal determined to a receiving end includes: determining, by the transmitting end, a transmission resource set corresponding to the synchronization channel; and transmitting, by the transmitting end, the synchronization signal through a resource in the transmission resource set determined.

In an exemplary embodiment, in the transmitting, by the transmitting end, the synchronization signal through a resource in the transmission resource set determined, the synchronization signals corresponding to the same transmission configuration adopt at least one of the following resources: the same sequence resource; the same time domain resource; the same beam resource; the same frequency domain resource and the power resource of the same size.

In an exemplary embodiment, the notifying, by the transmitting end, the receiving end of configuration information related to the synchronization signal determined includes: determining, by the transmitting end, M physical broadcast channels; notifying, by the transmitting end, the receiving end of the configuration information related to the synchronization signal determined through the M physical broadcast channels; where each of the M physical broadcast channels is bound to a respective one of $N_{tot}$ types of the downlink synchronization signals, M is a positive integer less than or equal to $N_{tot}$; or the M physical broadcast channels are bound to part or all of the synchronization signals among the $N_{tot}$ types of the downlink synchronization signals In an exemplary embodiment, reference demodulation signals about the physical broadcast channels determined by the transmitting end are part or all of the synchronization signals bound to the physical broadcast channels.

In an exemplary embodiment, in the notifying, by the transmitting end, the receiving end of the configuration information related to the synchronization signal determined through the M physical broadcast channels, at least one of the following information is notified, by the transmitting end, to the receiving end through the M physical broadcast channels: resource allocation information about a synchronization signal group to which the synchronization signal bound to the physical broadcast channel belongs; resource allocation information about the X synchronization signal groups; an index of the synchronization signal group to which the synchronization signal bound to the physical broadcast channel belong; an index of a resource group corresponding to the synchronization signal bound to the physical broadcast channel; and basic configuration information about the synchronization signal determined, where the basic configuration information comprises at least one parameter of a group consisting of: $N_{tot}$, $N_1$, $N_2$, ... $N_x$ and X.

In an exemplary embodiment, the resource allocation information includes at least one of: time domain resource index information, time domain resource group index information, frequency domain resource position information, frequency domain resource group position information, beam resource index information, beam resource group index information, sequence resource index information, sequence resource group index information, power resource indication information and sector resource indication information.

In an exemplary embodiment, in the case that the configuration information related to the synchronization signal determined is notified to the receiving end by the transmitting end in the manner of being indicated by the sequence group to which the sequence of the synchronization signal belongs, at least one of the followings is met: it is promised by the transmitting end and the receiving end that available sequences of the synchronization signals are divided into Y sequence groups, wherein Y is a natural number greater than 1, wherein an index of each of the Y sequence groups is used for indicating at least one of the followings: the resource allocation information about a synchronization signal classification and/or a synchronization signal group to which the synchronization signal belongs; the resource configuration information about the X synchronization signal groups; and at least one parameter of a group consisting of: $N_{tot}$, $N_1$, $N_2$, ... $N_x$ and X; it is promised by the transmitting end and the receiving end that the number of repetitions of the sequence of the synchronization signals is adopted for indicating at least one the followings: the resource allocation information about the synchronization signal classification and/or synchronization signal group to which the synchronization signal belongs; the resource allocation information about the X synchronization signal groups; and at least one parameter of a group consisting of: $N_{tot}$, $N_1$, $N_2$, ... $N_x$ and X;

in the case that the configuration information related to the synchronization signal determined is notified to the receiving end by the transmitting end in the manner of being indicated by the frequency domain mapping of the synchronization signal, features about the number of sub-carriers in the frequency domain mapping and/or positions of the sub-carriers are adopted for indicating at least one of the followings: the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X; and in the case that the configuration information related to the synchronization signal determined is notified to the receiving end by the transmitting end in the manner of being indicated by the time domain mapping of the synchronization signal, a parameter about a transmitting time interval of the same type of synchronization signal in the time domain is adopt for indicating at least one of the followings: the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X.

Another embodiment of the present disclosure provides a method for receiving a synchronization signal. The method includes: determining, by a receiving end, configuration information transmitted from a transmitting end, where the configuration information is related to the synchronization signal transmitted from the transmitting end; and acquiring the synchronization signal by the receiving end according to the configuration information.

In an exemplary embodiment, the synchronization signal includes X synchronization signal groups, where each group of the X synchronization signal groups includes a respective one of $N_1$, $N_2$, ... $N_x$ types of downlink synchronization signals corresponding to transmission configuration, where X is an integer greater than or equal to 1, $N_1$, $N_2$, ... $N_x$ are all integers greater than or equal to 1, and a sum $N_{tot}$ of types of the downlink synchronization signals included in the X synchronization signal groups equals to $N_1+N_2+ ... +N_x$.

In an exemplary embodiment, in the determining, by a receiving end, configuration information transmitted from a transmitting end, the configuration information is determined by the receiving end through at least one of the following manners: determining the configuration information by the receiving end according to information about a sequence group to which sequence of synchronization signal detected belong; determining the configuration information by the receiving end according to a frequency domain mapping manner of the synchronization signals detected; determining the configuration information by the receiving end according to a time domain mapping manner of the synchronization signals detected; acquiring the configuration information by the receiving end through signaling in a physical broadcast channel; and acquiring the configuration information by the receiving end according to higher layer configuration signaling.

In an exemplary embodiment, the X synchronization signal groups correspond to at least one of the followings: X transmission antenna groups; X reception antenna groups; and X antenna group pairs composed of the transmission antenna group and reception antenna group.

In an exemplary embodiment, the configuration information includes basic configuration information and/or resource configuration information. At least one of the followings is met in the method: the basic configuration information comprises at least one parameter of a group consisting of: $N_{tot}$, $N_1$, $N_2$, ... $N_x$ and X; the resource configuration information comprises at least one parameter of a group consisting of: a sequence resource allocation parameter, a beam resource allocation parameter, a time domain resource parameter, a frequency domain resource parameter, a power resource parameter and a transmission sector resource; the resource configuration information comprises index information about a resource group occupied by the synchronization signal; the resource configuration information comprises resource allocation information about part or all of the synchronization signal groups; and the resource configuration information comprises resource allocation information about one or more types of the synchronization signals.

In an exemplary embodiment, resource classifications corresponding to the resource configuration information include at least one of the followings: a beam resource, a sequence resource, a time domain resource, a frequency domain resource, a power resource and a transmission sector resource.

In an exemplary embodiment, in the case that the configuration information is determined by the receiving end according to the information about the sequence group to which the sequence of the synchronization signal detected belongs, at least one of the followings is met: it is promised by the transmitting end and the receiving end that available sequences of the synchronization signals are divided into Y sequence groups, where Y is a natural number greater than 1, an index of each of the Y sequence groups is used for indicating at least one of the followings: the resource allocation information about a synchronization signal classification and/or a synchronization signal group to which the synchronization signal belongs; the resource configuration information about the X synchronization signal groups; and at least one parameter of a group consisting of: $N_{tot}$, $N_1$, $N_2$, ... $N_x$ and X; it is promised by the transmitting end and the receiving end that the number of repetitions of the sequence of the synchronization signals is adopted for indicating at least one the followings: the resource allocation information about the synchronization signal classification and/or synchronization signal group to which the synchronization signal belongs; the resource allocation information about the X synchronization signal groups; and at least one parameter of a group consisting of: $N_{tot}$, $N_1$, $N_2$, ... $N_x$ and X;

in the case that the configuration information is determined by the receiving end according to the frequency domain mapping manner of the synchronization signal, at least one of the followings are determined by the receiving end according to features about the number of sub-carriers in the frequency domain mapping and/or positions of the sub-carriers: the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X; and in the case that the configuration information is determined by the receiving end according to the time domain mapping manner of the synchronization signal, at least one of the followings are determined by the receiving end according to a parameter about a transmitting time interval of the same type of synchronization signal in the time domain: the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X.

In an exemplary embodiment, the physical broadcast channel is bound to one or more synchronization signal groups; or the physical broadcast channel is bound to one or more types of synchronization signal.

In an exemplary embodiment, in the case that the physical broadcast channel is bound to the one or more of the synchronization signal groups, the signaling in the physical broadcast channel is further used for indicating at least one of the followings: the resource allocation information about the synchronization signal group to which the synchronization signal bound to the physical broadcast channel belongs; and an index of the synchronization signal group to which the synchronization signal bound to the physical broadcast channel belongs.

In an exemplary embodiment, the resource allocation information about the synchronization signal group to which the synchronization signal bound to the physical broadcast channel belongs includes a resource group index of the synchronization signal group to which the synchronization signal bound to the physical broadcast channel belongs.

In an exemplary embodiment, in the case that the physical broadcast channel is bound to one or more types of the synchronization signal, the signaling in the physical broadcast channel is further used for indicating at least one of the followings: the resource allocation information about a synchronization signal classification to which the synchronization signal bound to the physical broadcast channel pertains; and an index of the synchronization signal classification to which the synchronization signal bound to the physical broadcast channel pertains.

In an exemplary embodiment, the resource allocation information about the synchronization signal classification to which the synchronization signal bound to the physical broadcast channel pertains includes a resource group index of the synchronization signal classification to which the synchronization signal bound to the physical broadcast channel pertains.

Another embodiment of the present disclosure provides an apparatus for transmitting a synchronization signal. The apparatus is applied to a transmitting end, including: a first determination module configured to determine the synchronization signal; and a processing module configured to transmit the synchronization signal determined to a receiving end, and notify the receiving end of configuration information related to the synchronization signal determined.

Another embodiment of the present disclosure provides an apparatus for receiving a synchronization signal. The apparatus includes: a second determination module configured to determine configuration information transmitted from a transmitting end, where the configuration information is related to the synchronization signal transmitted from the transmitting end; and an acquisition module configured to acquire the synchronization signal according to the configuration information.

Another embodiment of the present disclosure provides a storage medium. The storage medium is configured to store program codes for executing the steps described above.

Another embodiment of the present disclosure provides a processor. The processor is configured to execute programs, which, when executed, execute the method of any one of the embodiments described above.

The embodiment of the present disclosure may determine the synchronization signal by the transmitting end and determine the configuration information related to the synchronization signal, thereby may implement the purpose of flexibly adjusting the synchronization signal by the transmitting end according to practical requirements. Therefore, compared with the related art where performance of the synchronization and coverage of the synchronization signal are affected due to low flexibility of the synchronization, the flexibility of the synchronization is improved, thereby reducing effects on performance of the synchronization and coverage of the synchronization signal.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and not to limit the present disclosure in any improper way. In the drawings:

FIG. 7 is a schematic diagram of indicating configuration information in a time domain mapping manner of the synchronization signal in an embodiment of the present disclosure;

FIG. 11 is a schematic diagram where the physical broadcast channel carries configuration information about a whole synchronization area according to an embodiment of the present disclosure;

FIG. 12 is a schematic diagram where the physical broadcast channel carries resource configuration information about a synchronization signal group or a synchronization signal classification bound to the physical broadcast channel according to an embodiment of the present disclosure;

FIG. 13 is a flowchart showing a method for receiving the synchronization signal according to an embodiment of the present disclosure;

DETAILED DESCRIPTION

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish similar objects and are not necessarily used to describe a particular order or sequence.

Figure 1:
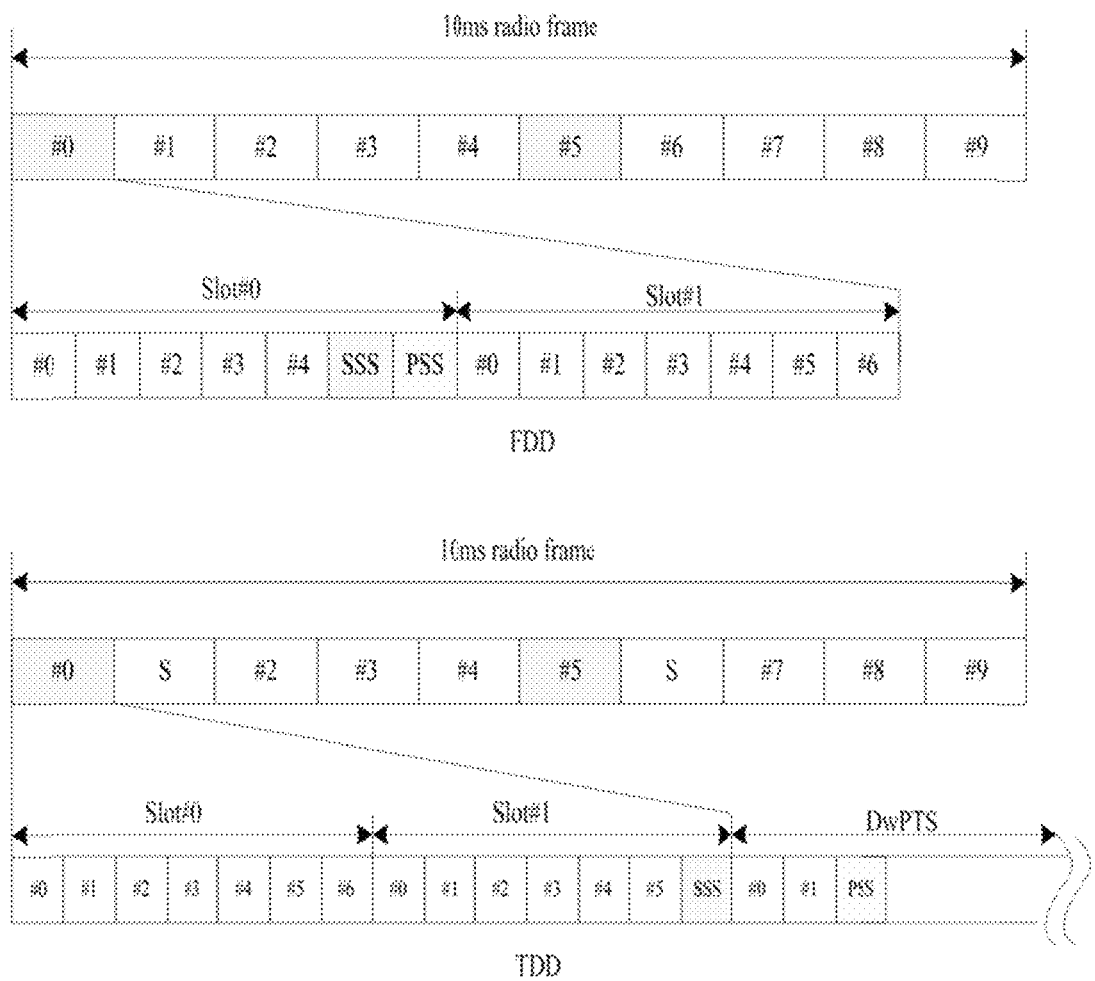
FIG. 1 is a schematic diagram showing time domain positions of primary and secondary synchronization signals in a LTE in the related art.
Figure 2:
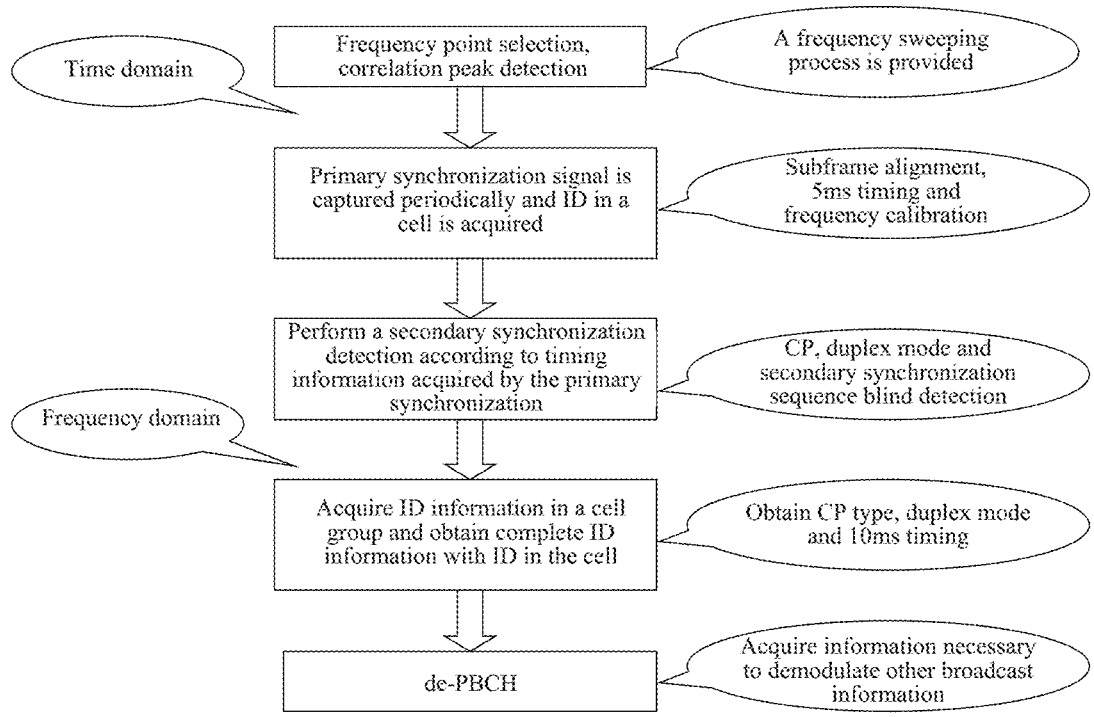
FIG. 2 is a schematic diagram showing a downlink synchronization process in the LTE in the related art.
Figure 3:
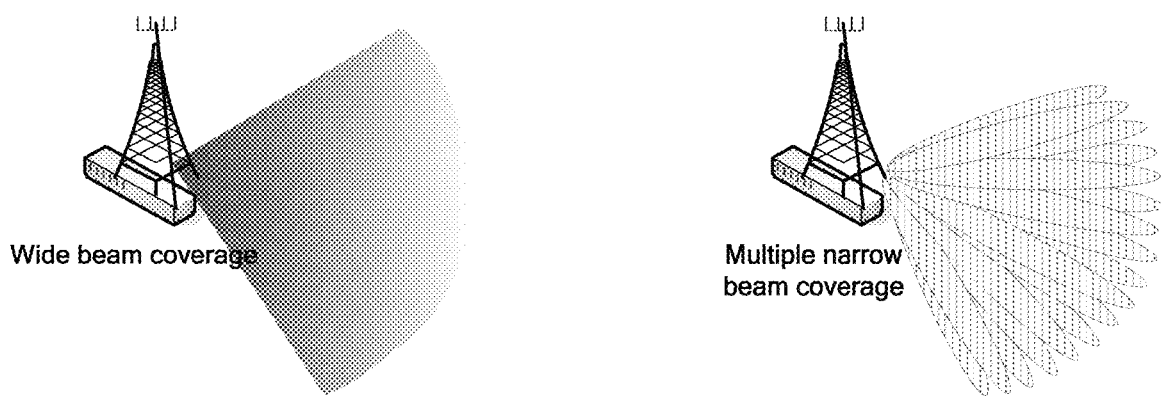
FIG. 3 is a schematic diagram showing wide beam coverage and multiple narrow beam coverage in the related art.
Figure 4:
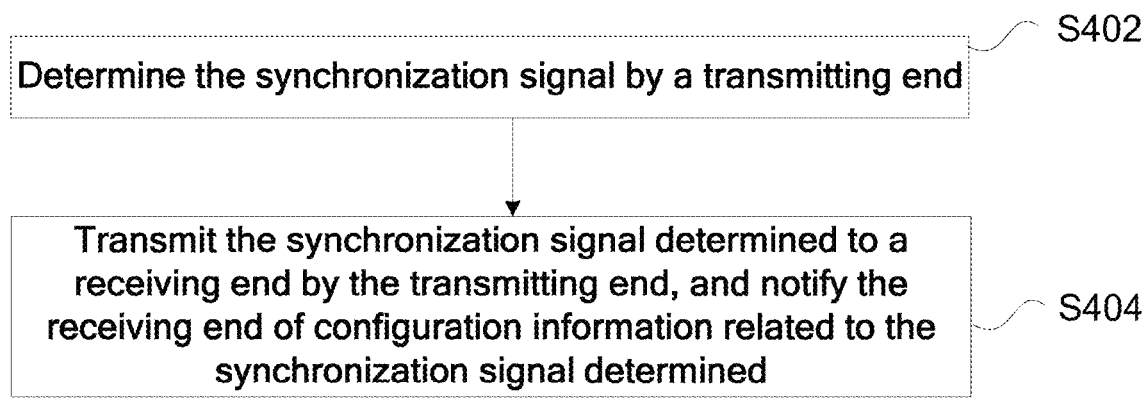
FIG. 4 is a flowchart showing a method for transmitting a synchronization signal according to an embodiment of the present disclosure.

This embodiment provides a method for transmitting a synchronization signal. FIG. 4 is a flowchart showing a method for transmitting a synchronization signal according to an embodiment of the present disclosure. As shown in FIG. 4, the method includes steps described below.

In step S402, the synchronization signal is determined by a transmitting end.

In step S404, the synchronization signal determined is transmitted to a receiving end from the transmitting end, and the receiving end is notified, by the transmitting end, of configuration information related to the synchronization signal determined.

The synchronization signal is used for synchronizing the receiving end with the transmitting end. The transmitting end may be a base station. The receiving end may be a base station other than the transmitting end, and may also be a terminal, or other devices required to be synchronized with the transmitting end.

Through the above steps, the synchronization signal and the configuration information related to the synchronization signal may be determined by the transmitting end, so that the transmitting end can flexibly adjust the synchronization signal according to practical requirements. Therefore, compared with the related art where performance of the synchronization and coverage of the synchronization signal are affected due to low flexibility of the synchronization, the flexibility of the synchronization is improved, thereby reducing effects on performance of the synchronization and coverage of the synchronization signal.

In an optional embodiment, the synchronization signal is determined by the transmitting end through the following manner: determining, by the transmitting end, X synchronization signal groups for synchronizing the transmitting end with the receiving end, where each of the X synchronization signal groups includes a respective one of $N_1$, $N_2$, ... $N_x$ types of downlink synchronization signals corresponding to transmission configuration (one type of synchronization signal may also be called one class of synchronization signal) (as shown in table 1), X is an integer greater than or equal to 1, $N_1$, $N_2$, ... $N_x$ are all integers greater than or equal to 1, and a sum $N_{tot}$ of the types of the downlink synchronization signals included in the X synchronization signal groups equals to $N_1+N_2+\ldots+N_x$. In this embodiment, the synchronization signals are divided into X groups, and an ith ($1 \leq i \leq X$) group of synchronization signals includes $N_i$ types of downlink synchronization signals. The transmission configuration may be used for configuring transmission resources (such as, transmission synchronization signal).

TABLE 1

| | |
|---|---|
| Synchronization signal group 1 | including $N_1$ types of synchronization signals |
| Synchronization signal group 2 | including $N_2$ types of synchronization signals |
| ... | ... |
| Synchronization signal group X | including $N_x$ types of synchronization signals |

In an optional embodiment, the receiving end is notified, by the transmitting end, of configuration information related to the synchronization signal determined through at least one of the following manners: the configuration information is indicated by signaling in a physical broadcast channel (also referred to as a physical multicast channel); the configuration information is indicated by higher layer configuration signaling; the configuration information is indicated by a sequence group to which a sequence of the synchronization signal belongs; the configuration information is indicated by signaling on another cell other than the cell corresponding to the synchronization signal; the configuration information is indicated by signaling on another sector other than the sector corresponding to the synchronization signal; the configuration information is indicated by signaling on another carrier frequency other than the carrier frequency corresponding to the synchronization signal; the configuration information is indicated by signaling on a transmission node other than the transmitting end; the configuration information is indicated in a frequency domain mapping of the synchronization signal; and the configuration information is indicated in a time domain mapping of the synchronization signal. Manners used for indicating the configuration information in this embodiment will be described with reference to the accompanying drawings.

Figure 5:
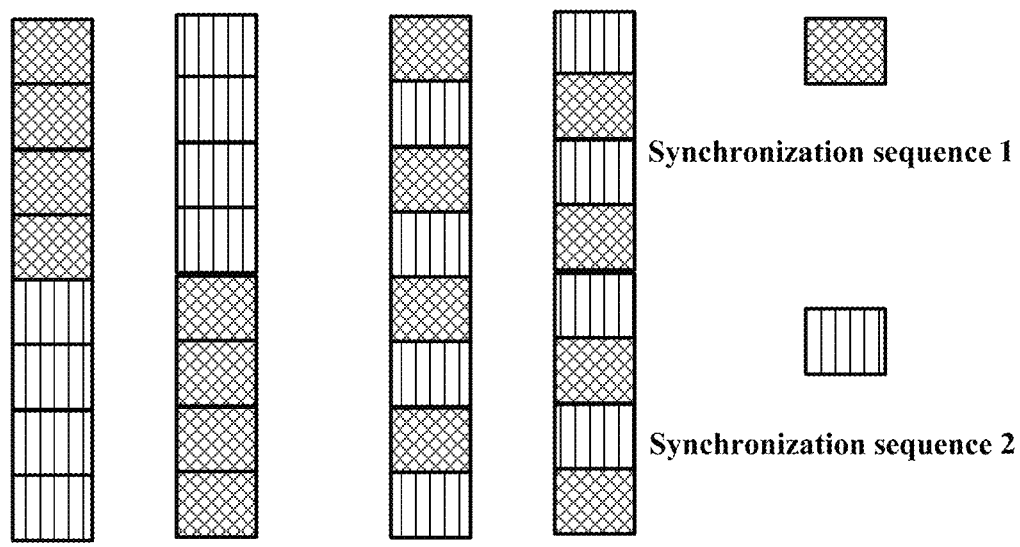
FIG. 5 is a schematic diagram I of indicating configuration information in a frequency domain mapping manner of the synchronization signal in an embodiment of the present disclosure.

In the case that the above-mentioned configuration information (including basic configuration information and/or resource configuration information) related to the synchronization signal is indicated (or determined) through the frequency domain mapping of the synchronization signal, reference can be made to FIG. 5. Different mapping manners of the synchronization sequence implicitly indicate different configuration parameters about the synchronization sequence, such as the X parameter, the $N_i$ parameter of a synchronization group to which a currently detected synchronization sequence belongs, and a resource allocation parameter about the currently detected synchronization sequence, such as allocation parameters about a beam resource, a sector resource, a time domain resource and a power resource.

Figure 6:
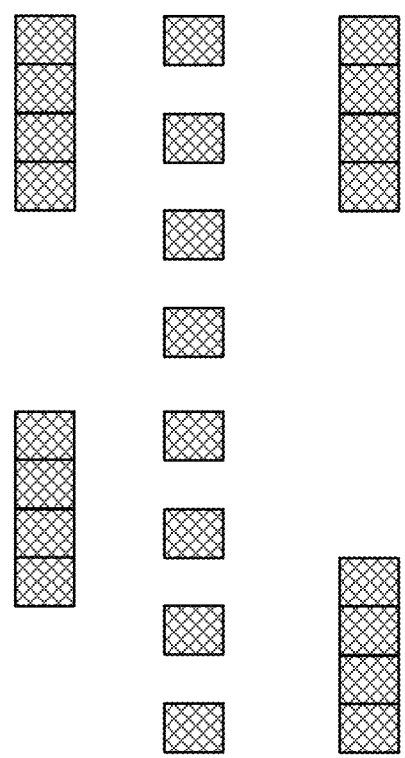
FIG. 6 is a schematic diagram II of indicating configuration information in a frequency domain mapping manner of the synchronization signal in an embodiment of the present disclosure.

In the case that the above-mentioned configuration information (including basic configuration information and/or resource configuration information) related to the synchronization signal is indicated through the frequency domain mapping of the synchronization signal, reference can be made to FIG. 6. Different mapping manners of the synchronization sequence implicitly indicate different configuration parameters about the synchronization sequence, such as the X parameter, the $N_i$ parameter of a synchronization group to which a currently detected synchronization sequence belongs, and a resource allocation parameter about the currently detected synchronization sequence, such as allocation parameters about a beam resource, a sector resource, a time domain resource and a power resource.

In the case that the configuration information is indicated through the time domain mapping of the synchronization signal, a transmission time interval parameter of the same type of synchronization signal in the time domain is adopted to indicate the resource allocation information about the synchronization signal group corresponding to the synchronization signal and/or the resource allocation information about X synchronization signal groups.

In the case that the configuration information is indicated through the time domain mapping of the synchronization signal, the transmission time interval parameter of the same type of synchronization signal in the time domain is adopted to indicate one or more of $N_{tot}$, $N_1$, $N_2$ ... $N_X$ and X.

Figure 7:
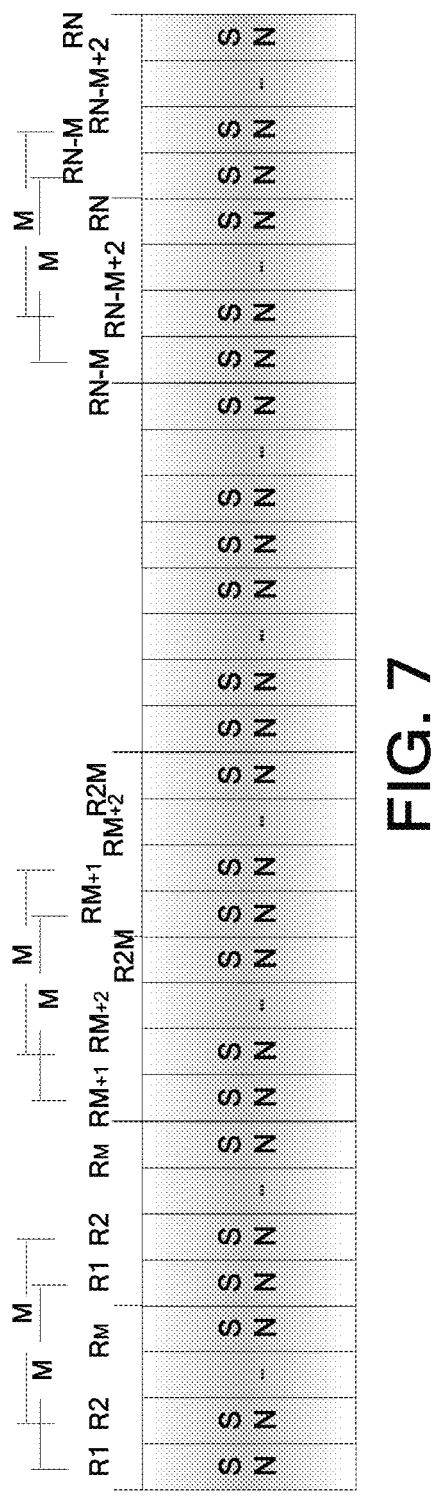

In the case that the above-mentioned configuration information (including basic configuration information and/or resource configuration information) related to the synchronization signal is indicated through the time domain mapping of the synchronization signal, reference can be made to FIG. 7. Different time domain mappings of the synchronization signal implicitly indicate different configuration parameters about the synchronization sequence, such as the X parameter, the $N_i$ parameter of the synchronization group to which the currently detected synchronization sequence belongs, and the resource allocation parameter about the currently detected synchronization sequence, such as the resource allocation parameter about the beam resource, sector resource, time domain resource and power resource. As shown in FIG. 7, different time domain intervals M indicates different configuration parameters about the synchronization signal (SN). In FIG. 7, "R" is the abbreviation of resource.

Figure 8:
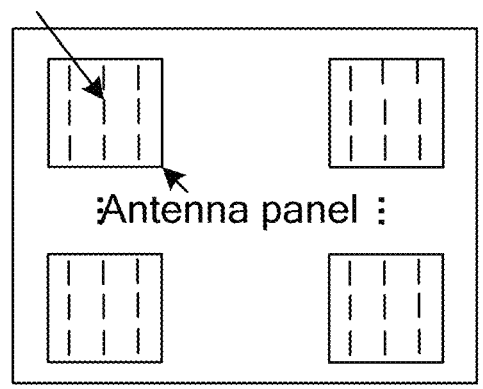
FIG. 8 is a schematic diagram showing an antenna panel according to an embodiment of the present disclosure.

In an optional embodiment, the X synchronization signal groups correspond to X transmission antenna groups (may also be referred to as transmission port groups) (as shown in table 2). Alternatively, the X synchronization signal groups correspond to X reception antenna groups (may also be referred to as reception port groups) (as shown in table 3). Alternatively, the X synchronization signal groups correspond to X antenna group pairs, where each antenna group pair is composed of a transmission antenna group and a reception antenna group (as shown in table 4). Antenna panels may refer to FIG. 8.

TABLE 2

| | |
|---|---|
| Transmission antenna group 1 | Synchronization signal group 1 |
| Transmission antenna group 2 | Synchronization signal group 2 |
| ... | |
| Transmission antenna group X | Synchronization signal group X |

TABLE 3

| | |
|---|---|
| Reception antenna group 1 | Synchronization signal group 1 |
| Reception antenna group 2 | Synchronization signal group 2 |
| ... | |
| Reception antenna group X | Synchronization signal group X |

TABLE 4

| | |
|---|---|
| A pair composed of transmission antenna group 1 and reception antenna group 1 | Synchronization signal group 1 |
| A pair composed of transmission antenna group 1 and reception antenna group 2 | Synchronization signal group 2 |
| ... | ... |
| A pair composed of transmission antenna group 2 and reception antenna group a | Synchronization signal group a |
| A pair composed of transmission antenna group 2 and reception antenna group 1 | Synchronization signal group a + 1 |
| A pair composed of transmission antenna group 2 and reception antenna group 2 | Synchronization signal group a + 2 |
| ... | ... |
| A pair composed of transmission antenna group 2 and reception antenna group a | Synchronization signal group 2a |
| ... | |
| A pair composed of transmission antenna group b and reception antenna group 1 | Synchronization signal group a * (b − 1) |
| A pair composed of transmission antenna group b and reception antenna group 2 | Synchronization signal group a * (b − 1) + 1 |
| ... | ... |

TABLE 4-continued

| A pair composed of transmission antenna group b and reception antenna group a | Synchronization signal group a * b |
|---|---|

In an optional embodiment, the configuration information includes the basic configuration information and/or resource configuration information. In the above method, at least one of the followings is met: the basic configuration information includes at least one parameter selected from a group consisting of: $N_{tot}$, $N_1$, $N_2$ ... $N_X$ and X; the resource configuration information includes at least one of: a sequence resource allocation parameter, a beam resource allocation parameter, a time domain resource parameter, a frequency domain resource parameter, a power resource parameter and a transmission sector resource parameter; the resource configuration information includes index information about a resource group occupied by the synchronization signal; the resource configuration information includes resource allocation information related to part or all of the synchronization signal groups; or the resource configuration information includes the resource allocation information related to one or more types of the synchronization signals.

In an optional embodiment, the power resource parameter is represented by offset information about relative power between the synchronization signals, or offset information about the relative power between the synchronization signal and physical broadcast channel.

In an optional embodiment, the part of resource group occupied by each type of the synchronization signal in any one of the X synchronization signal groups is determined by at least one of the following parameters: $N_{tot}$, $N_1$, $N_2$ ... $N_X$ and X.

In an optional embodiment, resource types corresponding to the resource configuration information include at least one of the followings: a beam resource, a sequence resource, a time domain resource, a frequency domain resource, a power resource and a transmission sector resource.

In an optional embodiment, the synchronization signal determined is transmitted to the receiving end from the transmitting end through following steps: determining, by the transmitting end, a transmission resource set corresponding to the synchronization channel; and transmitting, by the transmitting end, the synchronization signal through resources in the transmission resource set determined.

In an optional embodiment, when the synchronization signal is transmitted by the transmitting end, at least one of the followings is adopted for transmitting the synchronization signals corresponding to the same transmission configuration (may also be referred to as the same type of synchronization signals): the same sequence resource; the same time domain resource; the same beam resource; the same frequency domain resource; and the power resource of the same size. In this embodiment, the synchronization signals corresponding to the same transmission configuration correspond to a respective resource, as shown from table 5 to table 9.

TABLE 5

| $N_1$ types of synchronization signals | Synchronization signal using beam (group) a1<br>Synchronization signal using beam (group) a2<br>...<br>Synchronization signal using beam (group) $aN_1$ |
|---|---|
| $N_2$ types of synchronization signals | Synchronization signal using beam (group) b1<br>Synchronization signal using beam (group) b2<br>...<br>Synchronization signal using beam (group) $bN_2$ |
| ... | ... |
| $N_x$ types of synchronization signals | Synchronization signal using beam (group) x1<br>Synchronization signal using beam (group) x2<br>...<br>Synchronization signal using beam (group) $xN_2$ |

TABLE 6

| $N_1$ types of synchronization signals | Synchronization signal using frequency domain resource (group) a1<br>Synchronization signal using frequency domain resource (group) a2<br>...<br>Synchronization signal using frequency domain resource (group) $aN_1$ |
|---|---|
| $N_2$ types of synchronization signals | Synchronization signal using frequency domain resource (group) b1<br>Synchronization signal using frequency domain resource (group) b2<br>...<br>Synchronization signal using frequency domain resource (group) $bN_2$ |
| ... | ... |
| $N_x$ types of synchronization signals | Synchronization signal using frequency domain resource (group) x1<br>Synchronization signal using frequency domain resource (group) x2<br>...<br>Synchronization signal using frequency domain resource (group) $xN_2$ |

TABLE 7

| $N_1$ types of synchronization signals | Synchronization signal using sequence resource (group) a1<br>Synchronization signal using sequence resource (group) a2<br>...<br>Synchronization signal using sequence resource (group) $aN_1$ |
|---|---|
| $N_2$ types of synchronization signals | Synchronization signal using sequence resource (group) b1<br>Synchronization signal using sequence resource (group) b2<br>...<br>Synchronization signal using sequence resource (group) $bN_2$ |
| ... | ... |
| $N_x$ types of synchronization signals | Synchronization signal using sequence resource (group) x1<br>Synchronization signal using sequence resource (group) x2<br>...<br>Synchronization signal using sequence resource (group) $xN_2$ |

TABLE 8

| | |
|---|---|
| $N_1$ types of synchronization signals | Synchronization signal using power resource(group) a1 |
| | Synchronization signal using power resource(group) a2 |
| | ... |
| | Synchronization signal using power resource(group) $aN_1$ |
| $N_2$ types of synchronization signals | Synchronization signal using power resource(group) b1 |
| | Synchronization signal using power resource(group) b2 |
| | ... |
| | Synchronization signal using power resource(group) $bN_2$ |
| ... | ... |
| $N_x$ types of synchronization signals | Synchronization signal using power resource(group) x1 |
| | Synchronization signal using power resource(group) x2 |
| | ... |
| | Synchronization signal using power resource(group) $xN_2$ |

TABLE 9

| | |
|---|---|
| $N_1$ types of synchronization signals | Synchronization signal using sector resource(group) a1 |
| | Synchronization signal using sector resource(group) a2 |
| | ... |
| | Synchronization signal using sector resource(group) $aN_1$ |
| $N_2$ types of synchronization signals | Synchronization signal using sector resource(group) b1 |
| | Synchronization signal using sector resource(group) b2 |
| | ... |
| | Synchronization signal using sector resource(group) $bN_2$ |
| ... | ... |
| $N_x$ types of synchronization signals | Synchronization signal using sector resource(group) x1 |
| | Synchronization signal using sector resource(group) x2 |
| | ... |
| | Synchronization signal using sector resource(group) $xN_2$ |

It is to be noted that, in this embodiment, multiple resources defined above may be used in combination. For example, the synchronization signals corresponding to the same transmission configuration use the same beam and the same sequence; and the synchronization signals corresponding to the same transmission configuration use the same beam and the same power, and the like.

Figure 9:
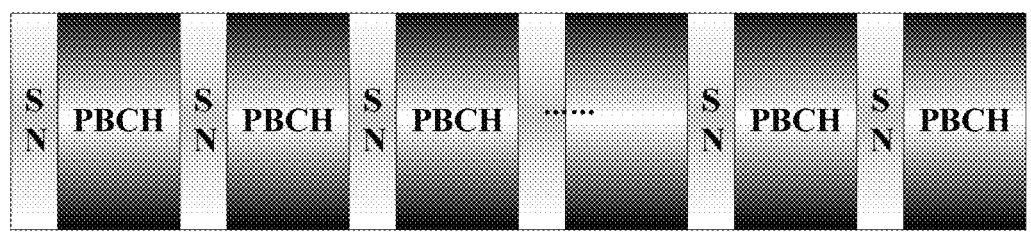
FIG. 9 is a schematic diagram I showing a correspondence between a physical broadcast channel and a synchronization signal according to an embodiment of the present disclosure.
Figure 10:
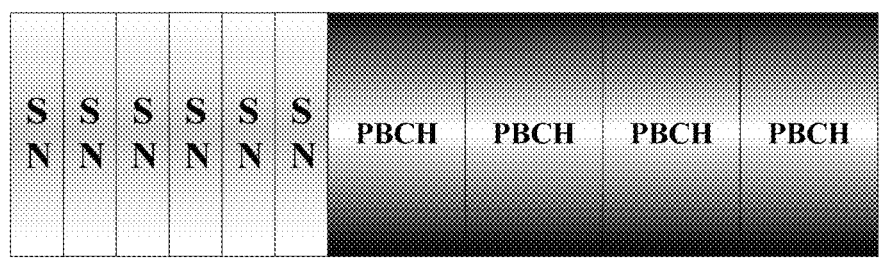
FIG. 10 is a schematic diagram II showing a correspondence between a physical broadcast channel and a synchronization signal according to an embodiment of the present disclosure.

In an optional embodiment, the receiving end is notified, by the transmitting end, of configuration information related to the synchronization signal determined through the following steps: determining, by the transmitting end, M physical broadcast channels (PBCH); notifying, by the transmitting end, the receiving end of the configuration information related to the synchronization signal determined by using the M physical broadcast channels; where each of the M physical broadcast channels is bound to a respective one of $N_{tot}$ types of the downlink synchronization signals, M is a positive integer less than or equal to $N_{tot}$ (that is, M ≤ Ntot). Alternatively, the M physical broadcast channels are bound to part or all of synchronization signals in the $N_{tot}$ types of the downlink synchronization signals. The above physical broadcast channels are bound to the downlink synchronization signals in the following manners: at least part of resources in the physical broadcast channels and the synchronization signals form a reference demodulation relationship; the physical broadcast channels and the synchronization signals correspond to the same (receiving/transmitting) beam/virtual sector/port/antenna/transmission node; the physical broadcast channels and the synchronization signals form a quasi-co-location relationship; a scrambling manner of the physical broadcast channels is associated with transmission resource positions (a sequence, a position, a beam, a sector, an antenna and a port and so on) used by the synchronization signals. In this embodiment, a correspondence between the physical broadcast channels and the synchronization signals may refer to FIGS. 9 and 10. In this embodiment, the physical broadcast channels may be bound to synchronization channel classifications and synchronization channel groups. Reference demodulation signals of the physical broadcast channels are part or all of synchronization signals being bound. Indexes of the physical broadcast channels are generally less than or equal to the types of the synchronization signals. The broadcast channels may carry configuration information related to the synchronization channels, including the configuration information related to the synchronization signal classification bound to the broadcast channels, synchronization signal groups bound to the broadcast channels and the synchronization signals not bound to the broadcast channels. For example, as shown in FIG. 11, the broadcast channels may carry the configuration information related to the whole synchronization area. Alternatively, as shown in FIG. 12, the broadcast channels may carry resource configuration information related to the synchronization signal groups bound to the physical broadcast channels or the synchronization signal classifications bound to the physical broadcast channels.

The configuration information in the above embodiment includes the basic configuration information and resource configuration information. The basic configuration information includes one or more of $N_{tot}$, $N_1$, $N_2$ ... $N_X$ and X. The resource configuration information includes one or more of the sequence resource allocation parameter, beam resource allocation parameter, time domain resource allocation parameter, frequency domain resource allocation parameter, power resource allocation parameter and transmission sector resource allocation parameter. In an exemplary embodiment, in the case of the power resource allocation parameter, the allocation of the power resource is represented by the offset information about relative power between the synchronization signals, or the offset information about relative power between the synchronization signal and the physical broadcast channel. In an exemplary embodiment, in the case of other resource allocation parameters, the other resource allocation parameters may be index information about the resource groups, such as an index of the sector resource group, an index of the beam resource group, an index of the sequence resource group and an index of the time domain resource group. In an exemplary embodiment, the size of resource group occupied by each type of the synchronization signals in the ith group may be determined by at least one or more of: $N_{tot}$, $N_1$, $N_2$ ... $N_X$ and X. For example, the greater $N_{tot}$ is, the less the resource included in the resource group occupied by each type of the synchronization signals is. The larger $N_i$ is, the less the resource included in the resource group occupied by each type of the synchronization signals is. The larger X is, the less the resource included in the resource group occupied by each type of the synchronization signals is.

A specific manner is: notifying in the physical broadcast channel the resource allocation information about the synchronization signal group to which the synchronization signal bound to the physical broadcast channel belongs; or the resource allocation information is time domain resource/resource group index information; or the resource allocation information is frequency resource/resource group position information; or the resource allocation information is beam resource/resource group index information; or the resource allocation information is sequence resource/resource group index information; or the resource allocation information is power resource indication information or the resource allocation information is sector resource indication information.

Another specific manner is notifying parameter information about X groups of synchronization channels in the physical broadcast channels, such as $N_{tot}$, $N_1$, $N_2$ ... $N_X$ and X.

Another specific manner is notifying parameter information about the ith group of synchronization channels bound to the physical broadcast channel in the physical broadcast channel, such as $N_i$.

In an optional embodiment, the determined reference demodulation signals of the physical broadcast channels are part or all of the synchronization signals bound to the physical broadcast channels.

In an optional embodiment, the notifying, by the transmitting end, the receiving end of the configuration information related to the synchronization signal determined by using the M physical broadcast channels includes: notifying, by the transmitting end, the receiving end of the resource allocation information about the synchronization signal group to which the synchronization signals bound to the physical broadcast channels belong by using the M physical broadcast channels; or notifying, by the transmitting end, the receiving end of the resource allocation information about the X synchronization signal groups by using the M physical broadcast channels; or notifying, by the transmitting end, the receiving end of indexes of the synchronization signal groups to which the synchronization signals bound to the physical broadcast channels belong by using the M physical broadcast channels; or notifying, by the transmitting end, the receiving end of an the indexes of resource groups corresponding to the synchronization signals bound to the physical broadcast channels by using the M physical broadcast channels; or notifying, by the transmitting end, the receiving end of the basic configuration information of the synchronization signal determined by using the M physical broadcast channels, where the basic configuration information includes at least one of the following parameters: $N_{tot}$, $N_1$, $N_2 \ldots N_X$ and X.

In an optional embodiment, the resource allocation information includes at least one of: time domain resource index information, time domain resource group index information, frequency domain resource position information, frequency domain resource group position information, beam resource index information, beam resource group index information, sequence resource index information, sequence resource group index information, power resource indication information and sector resource indication information.

In an optional embodiment, the above method includes at least one of:

In the case that the configuration information related to the synchronization signal determined is notified to the receiving end by the transmitting end in the manner of being indicated by the sequence group to which the sequence of the synchronization signal belongs, the method includes at least one of the following steps:

it is promised by the transmitting end and the receiving end that available sequences of the synchronization signals are divided into Y sequence groups, where Y is a natural number greater than 1. Indexes of the Y sequence groups are used for indicating the resource allocation information about the synchronization signal classification and/or the synchronization signal group to which the synchronization signal belongs; and/or the indexes of the Y sequence groups are used for indicating resource configuration information about the X synchronization signal groups; and/or the indexes of the Y sequence groups are used for indicating at least one of the following parameters: $N_{tot}$, $N_1$, $N_2 \ldots N_X$ and X;

it is promised by the transmitting end and the receiving end that the number of repetitions of the sequences of the synchronization signals is used for indicating the resource allocation information about the synchronization signal classification and/or the synchronization signal group to which the synchronization signal belongs, and/or indicating the resource allocation information about the X synchronization signal groups, and/or indicating at least one of the following parameters: $N_{tot}$, $N_1$, $N_2 \ldots N_X$ and X.

In the case that the configuration information related to the synchronization signal determined is notified to the receiving end by the transmitting end in the manner of being indicated by the frequency domain mapping of the synchronization signal, features about the number of sub-carriers and/or sub-carrier positions of the frequency domain mapping are used for indicating at least one of the followings: the resource allocation information about the synchronization signal group corresponding to the synchronization signal; the resource allocation information about the X synchronization signal groups; and/or at least one of the following parameters: $N_{tot}$, $N_1$, $N_2 \ldots N_X$ and X.

In the case that the configuration information related to the synchronization signal determined is notified to the receiving end by the transmitting end in the manner of being indicated by the time domain mapping of the synchronization signal, a parameter about the transmitting time interval of the same type of synchronization signal in the time domain is used for indicating at least one of the followings: the resource allocation information related to the synchronization signal groups corresponding to the synchronization signals; the resource allocation information related to the X synchronization signal groups; and/or at least one of the following parameters: $N_{tot}$, $N_1$, $N_2 \ldots N_X$ and X.

The embodiment provides a method for receiving the synchronization signal. FIG. 13 is a flowchart showing a method for receiving the synchronization signal according to an embodiment of the present disclosure. As shown in FIG. 13, the method includes steps described below.

In step S1302: configuration information transmitted from a transmitting end is determined by a receiving end, where the configuration information is the configuration information related to a synchronization signal transmitted from the transmitting end.

In step S1304: the synchronization signal is acquired by the receiving end according to the configuration information.

The transmitting end may be a base station, and the receiving end may be another base station, terminal or other device required to be synchronized with the transmitting end.

Through the above steps, the synchronization signal and the configuration information related to the synchronization signal may be determined by the transmitting end, so that the transmitting end can flexibly adjust the synchronization signal according to practical requirements. Therefore, compared with the related art where performance of the synchronization and coverage of the synchronization signal are affected due to low flexibility of the synchronization, the flexibility of the synchronization is improved, thereby reducing effects on performance of the synchronization and coverage of the synchronization signal.

In an optional embodiment, the above synchronization signal includes X synchronization signal groups. Each of the X synchronization signal groups includes a respective one of $N_1, N_2, \ldots N_X$ types of downlink synchronization signals corresponding to transmission configuration. X is an integer greater than or equal to 1, and $N_1, N_2, \ldots N_X$ are all integers greater than or equal to 1. A sum $N_{tot}$ of the types of the downlink synchronization signals included in the X synchronization signal groups equals to $N_1+N_2+ \ldots +N_X$.

In an optional embodiment, the configuration information transmitted from the transmitting end is determined by the receiving end through at least one of the following manners: being determined, by the receiving end, according to information about sequence group to which sequences of detected synchronization signal belong; being determined, by the receiving end, according to a frequency domain mapping manner of the detected synchronization signal; being determined, by the receiving end, according to a time domain mapping manner of the detected synchronization signal; being acquired according to signaling in a physical broadcast channel; and being acquired, by the receiving end, according to higher layer configuration signaling. In this embodiment, the receiving end may detect the synchronization signal and obtain information about the sequence group to which the sequence of synchronization signals being successfully detected belongs; and the receiving end determines configuration information related to the synchronization signal according to the information about the sequence group. Alternatively, the receiving end may detect the synchronization signal and obtain information about the frequency domain mapping manner of the synchronization signals being successfully detected, and the receiving end determines the configuration information related to the synchronization signal according to the information about the frequency domain mapping manner. Alternatively, the receiving end may detect the synchronization signal and obtain information about the time domain mapping manner of the synchronization signal being successfully detected, and the receiving end determines the configuration information related to the synchronization signal according to the information about the time domain mapping manner. Alternatively, the receiving end acquires the configuration information related to the synchronization signal through signaling in the physical broadcast channel. Alternatively, the receiving end acquires the configuration information related to the synchronization signal through higher layer configuration signaling. One or more of the following parameters may be determined according to configuration indication signaling related to the synchronization signal:

the number of the synchronization signal groups X;

the number of types of synchronization signals included in the synchronization signal groups, such as an index of a synchronization signal group to which the synchronization signal types bound to the physical broadcast channel belong;

a total number of the types of the synchronization signals $N_{tot}$;

a sequence resource allocation parameter about the synchronization signal, such as an index of a sequence group corresponding to the synchronization signals bound to the physical broadcast channel;

a beam resource allocation parameter about the synchronization signal, such as an index of a beam group corresponding to the synchronization signals bound to the physical broadcast channel;

a time domain resource parameter about the synchronization signal, such as an index of a time domain signal group corresponding to the synchronization signals bound to the physical broadcast channel;

a frequency domain resource parameter about the synchronization signal, such as an index of a frequency domain resource group corresponding to the synchronization signals bound to the physical broadcast channel and a frequency domain position;

a power parameter about the synchronization signal, such as power offset of the synchronization signal bound to the physical broadcast channel;

a transmission sector resource parameter about the synchronization signal, such as an index of a transmission sector group index corresponding to the synchronization signal bound to the physical broadcast channel.

In an optional embodiment, the X synchronization signal groups correspond to X transmission antenna groups. Alternatively, the X synchronization signal groups correspond to X reception antenna groups. Alternatively, the X synchronization signal groups correspond to X antenna group pairs composed of the transmission antenna group and reception antenna group.

In an optional embodiment, the configuration information includes basic configuration information and/or resource configuration information. In the above method, at least one of the followings is met: the basic configuration information includes at least one of the following parameters: $N_{tot}$, $N_1$, $N_2$ . . . $N_X$ and X; the resource configuration information includes at least one of the following parameters: the sequence resource allocation parameter, beam resource allocation parameter, time domain resource allocation parameter, frequency domain resource allocation parameter, power resource allocation parameter and transmission sector resource allocation parameter; the resource configuration information includes information about an index of a resource group occupied by the synchronization signal; the resource configuration information includes resource allocation information about part or all of the synchronization signal groups; and the resource configuration information includes the resource allocation information about one or more types of the synchronization signals. In this embodiment, in the case that the resource configuration information is the power resource parameter, the power resource parameter may be represented by information about relative power offset between the synchronization signals or information about the relative power offset between the synchronization signal and physical broadcast channel. In an exemplary embodiment, in the case that the resource configuration information is other resource parameter, which may be information about the index of the resource group, such as an index of a sector resource group, an index of a beam resource group, an index of a sequence resource group and an index of a time domain resource group. The resource configuration information in this embodiment is the resource allocation information about the synchronization signal group to which the synchronization signals belong or the resource allocation information about all synchronization signal groups. Alternatively, the resource configuration information in this embodiment is the resource allocation information about a synchronization signal classification to which the synchronization signal pertains or the resource allocation information about all synchronization signal classifications.

In an optional embodiment, resource classifications corresponding to the resource allocation information include at least one of: a beam resource, a sequence resource, a time domain resource, a frequency domain resource, a power resource and a transmission sector resource.

In an optional embodiment, the above method includes at least one of the followings:

based on the information about the sequence group to which the sequence of the detected synchronization signal belongs, the receiving end determines the configuration information through at least one of the following manners:

it is promised by the transmitting end and the receiving end that available sequences of the synchronization signals are divided into Y sequence groups, where Y is a natural number greater than 1. Indexes of the Y sequence groups are used for indicating the resource allocation information about a synchronization signal classification and/or a synchronization signal group to which the synchronization signal belongs; and/or the indexes of the Y sequence groups are used for indicating resource configuration information about the X synchronization signal groups; and/or the indexes of the Y sequence groups are used for indicating at least one of the following parameters: $N_{tot}$, $N_1$, $N_2$ . . . $N_X$ and X;

it is promised by the transmitting end and the receiving end that the number of repetitions of the sequences of the synchronization signal is used for indicating the resource allocation information about the synchronization signal classification and/or the synchronization signal group to which the synchronization signal belongs, and/or indicating the resource allocation information about the X groups of synchronization signal, and/or indicating at least one of the following parameters: $N_{tot}$, $N_1$, $N_2$ . . . $N_X$ and X;

In the case that the configuration information is determined by the receiving end according to the frequency domain mapping manner of the detected synchronization signal, the receiving end determines at least one of the followings based on features about the number of sub-carriers and/or sub-carrier positions of the frequency domain mapping:

the resource allocation information about the synchronization signal group corresponding to the synchronization signal; the resource allocation information about the X synchronization signal groups; and at least one of the following parameters: $N_{tot}$, $N_1$, $N_2$ . . . $N_X$ and X;

In the case that the configuration information is determined by the receiving end according to the time domain mapping manner of the detected synchronization signal, the receiving end determines at least one of the followings based on a parameter about a transmitting time interval of the same type of synchronization signal in the time domain:

the resource allocation information about the synchronization signal group corresponding to the synchronization signal; the resource allocation information about the X synchronization signal groups; and at least one of the following parameters: $N_{tot}$, $N_1$, $N_2$ . . . $N_X$ and X.

In an optional embodiment, the physical broadcast channel is bound to one or more groups of synchronization signals. Alternatively, the physical broadcast channel is bound to one or more types of synchronization signals.

In an optional embodiment, in the case that the physical broadcast channel is bound to one or more groups of synchronization signals, the signaling in the physical broadcast channel is further used for indicating one of the followings: the resource allocation information about the synchronization signal group to which the synchronization signals bound to the physical broadcast channel belong; and/or an index of the synchronization signal group to which the synchronization signals bound to the physical broadcast channel belongs.

In an optional embodiment, the resource allocation information about the synchronization signal group to which the synchronization signal bound to the physical broadcast channel belongs includes a resource group index of the synchronization signal to which the synchronization signal bound to the physical broadcast channel belongs.

In an optional embodiment, in the case that the physical broadcast channel is bound to one or more types of synchronization signals, the signaling in the physical broadcast channel is further used for indicating the followings: the resource allocation information about the synchronization signal classification to which the synchronization signal bound to the physical broadcast channel belongs; and/or an index of the synchronization signal classification to which the synchronization signal bound to the physical broadcast channel belongs.

In an optional embodiment, the resource allocation information about the synchronization signal classification to which the synchronization signal bound to the physical broadcast channel belongs includes the resource group index of the synchronization signal classification to which the synchronization signal bound to the physical broadcast channel belongs.

From the description of the implementation modes described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the essence of solutions provided by the present disclosure or the part contributing to the related art, may be embodied in the form of a software product. The computer software product is stored in a storage medium (such as ROM/RAM, a magnetic disk or an optical disk) and includes several instructions for enabling a terminal device (which may be a mobile phone, a computer, a server, a network device, or the like) to execute the method according to each embodiment of the present disclosure.

The embodiment further provides an apparatus for transmitting a synchronization signal. The apparatus is configured to implement the above embodiments and preferred implementations. What has been described will not be repeated. As used below, the term "module" may be software, hardware or a combination thereof capable of implementing predetermined functions. The apparatus in the embodiment described below is preferably implemented by software. However, it is possible and conceived that the apparatus may be implemented by hardware or by a combination of software and hardware.

Figure 14:
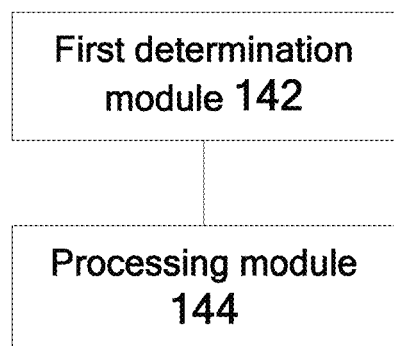
FIG. 14 is a block diagram showing an apparatus for transmitting the synchronization signal according to an embodiment of the present disclosure.

FIG. 14 is a block diagram showing the apparatus transmitting for the synchronization signal according to an embodiment of the present disclosure. As shown in FIG. 14, the apparatus may be applied to a transmitting end (such as, a base station). The apparatus includes a first determination module 142 and a processing module 144. The apparatus is described below.

The first determination module 142 is configured to determine the synchronization signal. The processing module 144 is connected to the first determination module 142, and is configured to transmit the synchronization signal determined to a receiving end and notify the receiving end of configuration information related to the synchronization signal determined.

In an optional embodiment, the first determination module 142 is configured to determine X synchronization signal groups. Each of the X synchronization signal groups includes a respective one of $N_1$, $N_2$, . . . $N_x$ types of downlink synchronization signals corresponding to transmission configuration, where X is an integer greater than or equal to 1, $N_1$, $N_2$, . . . $N_x$ are all integers greater than or equal to 1, and a sum $N_{tot}$ of the types of the downlink synchronization signals included in the X synchronization signal groups equals to $N_1+N_2+ \ldots +N_x$.

In an optional embodiment, the processing module 114 may notify the receiving end of configuration information of the synchronization signal determined through at least one of the following manners: indicating the configuration information by signaling in a physical broadcast channel; indicating the configuration information by higher layer signaling; indicating the configuration information by a sequence group to which a sequence of the synchronization signal belongs; indicating the configuration information by signaling on another cell other than a cell corresponding to the synchronization signal; indicating the configuration information by signaling on another sector other than a sector corresponding to the synchronization signal; indicating the configuration information by signaling on another carrier frequency other than a carrier frequency corresponding to the synchronization signal; indicating the configuration information by signaling on a transmission node other than the transmitting end; indicating the configuration information by a frequency domain mapping of the synchronization signal; and indicating the configuration information by a time domain mapping of the synchronization signal.

In an optional embodiment, the X synchronization signal groups correspond to X transmission antenna groups. Alternatively, the X synchronization signal groups correspond to X reception antenna groups. Alternatively, the X synchronization signal groups correspond to X antenna group pairs composed of the transmission antenna group and the reception antenna group.

In an optional embodiment, the configuration information includes basic configuration information and/or resource configuration information. The apparatus satisfies at least one of the followings: the basic configuration includes at least one of the following parameters: $N_{tot}$, $N_1$, $N_2$ ... $N_X$ and X; the resource configuration information includes at least one of: a sequence resource allocation parameter, a beam resource allocation parameter, a time domain resource parameter, a frequency domain resource parameter, a power resource parameter and a transmission sector resource parameter; the resource configuration information includes index information about a resource group occupied by the synchronization signal; the resource configuration information includes resource allocation information about part or all of synchronization signal groups; and the resource configuration information includes the resource allocation information about one or more types of the synchronization signals.

In an optional embodiment, the power resource parameter is represented by information about relative power offset between the synchronization signals, or information about the relative power offset between the synchronization signal and physical broadcast channel.

In an optional embodiment, the part of resource group occupied by each type of the synchronization signal in any one of the X synchronization signal groups is determined by at least one of the following parameters: $N_{tot}$, $N_1$, $N_2$ ... $N_X$ and X.

In an optional embodiment, resource types corresponding to the resource configuration information include at least one of the followings: a beam resource, a sequence resource, a time domain resource, a frequency domain resource, a power resource and a transmission sector resource.

In an optional embodiment, the processing module 114 is configured to transmit the synchronization signal determined to the receiving end through the following steps: determining a transmission resource set corresponding to the synchronization channel; and transmitting the synchronization signal through resources in the transmission resource set determined.

In an optional embodiment, when the processing module 144 transmits the synchronization signal, at least one of the followings is used for transmitting the synchronization signals corresponding to the same transmission configuration: the same sequence resource; the same time domain resource; the same beam resource; the same frequency domain resource and power resource of the same size.

In an optional embodiment, the processing module 144 is configured to notify the receiving end of the configuration information related to the synchronization signal determined in the following manners: determining M physical broadcast channels; notifying the receiving end of the configuration information related to the synchronization signal determined through the M physical broadcast channels; where each of the M physical broadcast channels is bound to a respective one of $N_{tot}$ types of the downlink synchronization signals, M is a positive integer less than or equal to $N_{tot}$ (that is, M $\leq N_{tot}$). Alternatively, the M physical broadcast channels are bound to part or all of synchronization signals in the $N_{tot}$ types of the downlink synchronization signals.

In an optional embodiment, reference demodulation signals of the physical broadcast channels determined are part or all of synchronization signals bound to the physical broadcast channels.

In an optional embodiment, the processing module 144 is configured to notify the receiving end of the configuration information related to the synchronization signal determined through the M physical broadcast channels in the following manners: notifying the receiving end of resource allocation information about the synchronization signal group to which the synchronization signal bound to the physical broadcast channel belongs through the M physical broadcast channels; or notifying the receiving end of the resource allocation information about the X synchronization signal groups through the M physical broadcast channels; or notifying the receiving end of an index of the synchronization signal group to which the synchronization signal bound to the physical broadcast channel belongs through the M physical broadcast channels; or notifying the receiving end of an index of the resource group corresponding to the synchronization signal bound to the physical broadcast channel through the M physical broadcast channels; or notifying the receiving end of the basic configuration information about the synchronization signal determined through the M physical broadcast channels, where the basic configuration information includes at least one of the following parameters: $N_{tot}$, $N_1$, $N_2$ ... $N_X$ and X.

In an optional embodiment, the resource allocation information includes at least one of the followings: time domain resource index information, time domain resource group index information, frequency domain resource position information, frequency domain resource group position information, beam resource index information, beam resource group index information, sequence resource index information, sequence resource group index information, power resource indication information and sector resource indication information.

In an optional embodiment, in the apparatus, in the case that the processing module 144 is configured to notify the receiving end of the configuration information related to the synchronization signal determined by indicating the configuration information through the sequence group to which the sequence of the synchronization signal belongs, at least one of the following is met:

it is promised by the transmitting end and the receiving end that available sequences of the synchronization signals are divided into Y sequence groups, where Y is a natural number greater than 1. Indexes of the Y sequence groups are used for indicating the resource allocation information about the synchronization signal classification and/or the synchronization signal group to which the synchronization signal belongs; and/or the indexes of the Y sequence groups are used for indicating resource configuration information about the X synchronization signal groups; and/or the indexes of the Y sequence groups are used for indicating at least one of the following parameters: $N_{tot}$, $N_1$, $N_2$ ... $N_X$ and X;

it is promised by the transmitting end and the receiving end that the number of repetitions of the sequences of the synchronization signals is used for indicating the resource allocation information about the synchronization signal classification and/or the synchronization signal group to which the synchronization signal belongs, and/or indicating the resource allocation information about the X synchronization signal groups, and/or indicating at least one of the following parameters: $N_{tot}$, $N_1$, $N_2$ ... $N_X$ and X.

In the case that the processing module 144 is configured to notify the receiving end of the configuration information related to the synchronization signal determined by indicating the configuration information through the frequency domain mapping of the synchronization signal, features about the number of sub-carriers and/or sub-carrier positions of the frequency domain mapping are used for indicating at least one of the followings:

the resource allocation information about the synchronization signal group corresponding to the synchronization signal; the resource allocation information about the X synchronization signal groups; and at least one of the following parameters: $N_{tot}$, $N_1$, $N_2$ ... $N_X$ and X.

In the case that the processing module 144 is configured to notify the receiving end of the configuration information related to the synchronization signal determined by indicating the configuration information through the time domain mapping of the synchronization signal, a transmission time interval parameter of the same type of synchronization signal in the time domain is adopted to indicate at least one of the followings:

the resource allocation information about the synchronization signal group corresponding to the synchronization signal; the resource allocation information about the X synchronization signal groups; and at least one of the following parameters: $N_{tot}$, $N_1$, $N_2$ ... $N_X$ and X.

Figure 15:
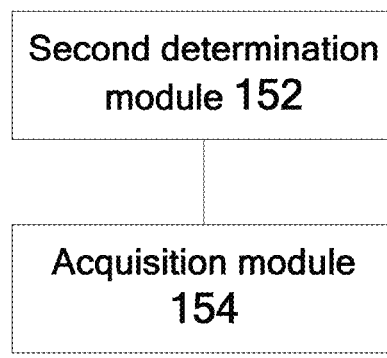
FIG. 15 is a block diagram showing an apparatus for receiving the synchronization signal according to an embodiment of the present disclosure.

FIG. 15 is a block diagram showing an apparatus for receiving a synchronization signal according to an embodiment of the present disclosure. The apparatus may be applied to the receiving end (including a base station, a terminal). As shown in FIG. 15, the apparatus includes a second determination module 152 and an acquisition module 154. The apparatus is described below.

The second determination module 152 is configured to determine configuration information transmitted from a transmitting end. The configuration information is related to the synchronization signal transmitted from the transmitting end. The acquisition module 154 which is connected to the second determination module 152 is configured to acquire the synchronization signal according to the configuration information.

In an optional embodiment, the synchronization signal includes X synchronization signal groups. Each of the X synchronization signal groups includes a respective one of $N_1$, $N_2$, ... $N_X$ types of downlink synchronization signals corresponding to transmission configuration. X is an integer greater than or equal to 1. $N_1$, $N_2$, ... $N_X$ are all integers greater than or equal to 1 and a sum $N_{tot}$ of the types of the downlink synchronization signals included in the X synchronization signal groups equals to $N_1+N_2+ ... +N_X$.

In an optional embodiment, the second determination module 152 is configured to determine the configuration information transmitted from the transmitting end in at least one of the following manners: determining, according to information about the sequence group to which sequences of synchronization signals detected belong, the configuration information; determining, according to a frequency domain mapping manner of the synchronization signals detected, the configuration information; determining, according to a time domain mapping manner of the synchronization signals detected, the configuration information; acquiring, according to signaling in a physical broadcast channel, the configuration information; and acquiring, according to higher layer configuration signaling, the configuration information.

In an optional embodiment, the X synchronization signal groups correspond to X transmission antenna groups. Alternatively, the X synchronization signal groups correspond to X reception antenna groups. Alternatively, the X synchronization signal groups correspond to X antenna group pairs composed of the transmission antenna group and reception antenna group.

In an optional embodiment, the configuration information includes basic configuration information and/or resource configuration information. With respect to the apparatus, at least one of the followings is met: the basic configuration information includes at least one of the following parameters: $N_{tot}$, $N_1$, $N_2$ ... $N_X$ and X; the resource configuration information includes at least one of: a sequence resource allocation parameter, a beam resource allocation parameter, a time domain resource parameter, a frequency domain resource parameter, a power resource parameter and a transmission sector resource parameter; the resource configuration information includes information about an index of a resource group occupied by the synchronization signals; the resource configuration information includes resource allocation information about part or all of synchronization signal groups; and the resource configuration information includes the resource allocation information about one or more types of the synchronization signals.

In an optional embodiment, resource classifications corresponding to the resource configuration information include at least one of: a beam resource, a sequence resource, a time domain resource, a frequency domain resource, a power resource and a transmission sector resource.

In an optional embodiment, at least one of the followings is met:

In the case that the second determination module 152 is configure to determine the configuration information according to the information about the sequence group to which the sequences of synchronization signals detected belong, at least one of the followings is met:

it is promised by the transmitting end and the receiving end that available sequences of the synchronization signals are divided into Y sequence groups, where Y is a natural number greater than 1, the indexes of the Y sequence groups are used for indicating at least one of the followings: the resource allocation information about a synchronization signal classification and/or synchronization signal groups to which the synchronization signals belong; resource configuration information about the X synchronization signal groups; and at least one of the following parameters: $N_{tot}$, $N_1$, $N_2$ ... $N_X$ and X;

it is promised by the transmitting end and the receiving end that the number of repetitions of the sequences of the synchronization signals are used for indicating at least one of the followings: the resource allocation information about the synchronization signal classification and/or synchronization signal groups to which the synchronization signals belong; the resource allocation information about the X synchronization signal groups; and at least one of the following parameters: $N_{tot}$, $N_1$, $N_2$ ... $N_X$ and X.

In the case that the second determination module 152 is configured to determine the configuration information according to the frequency domain mapping manner of the detected synchronization signals, features about the number of sub-carriers and/or sub-carrier positions of the frequency domain mapping are used for determining at least one of the followings:

the resource allocation information about the synchronization signal groups corresponding to the synchronization signals; the resource allocation information about the X synchronization signal groups; and at least one of the following parameters: $N_{tot}$, $N_1$, $N_2$ ... $N_X$ and X.

In the case that the second determination module 152 is configured to determine the configuration information according to the time domain mapping manner of the detected synchronization signals, the parameter about a transmission time interval of the same type of synchronization signals in the time domain is used for determining at least one of the followings:

the resource allocation information about the synchronization signal groups corresponding to the synchronization signals; the resource allocation information about the X synchronization signal groups; and at least one of the following parameters: $N_{tot}$, $N_1$, $N_2$ ... $N_X$ and X.

In an optional embodiment, the physical broadcast channel is bound to one or more groups of synchronization signals. Alternatively, the physical broadcast channel is bound to one or more types of synchronization signals.

In an optional embodiment, when the physical broadcast channel is bound to the one or more groups of synchronization signals, the signaling in the physical broadcast channel is further used for indicating the followings: the resource allocation information about the synchronization signal groups to which the synchronization signals bound to the physical broadcast channel belong; and/or indexes of the synchronization signal groups to which the synchronization signals bound to the physical broadcast channel belong.

In an optional embodiment, the resource allocation information about the synchronization signal group to which the synchronization signal bound to the physical broadcast channel belongs includes the resource group index of the synchronization signal group to which the synchronization signal bound to the physical broadcast channel belongs.

In an optional embodiment, in the case that the physical broadcast channel is bound to one or more types of synchronization signals, the signaling in the physical broadcast channel is further used for indicating at least one of the followings: the resource allocation information about the synchronization signal classification to which the synchronization signal bound to the physical broadcast channel pertains; and the index of the synchronization signal classification to which the synchronization signal bound to the physical broadcast channel pertains.

In an optional embodiment, the resource allocation information about the synchronization signal classification to which the synchronization signal bound to the physical broadcast channel pertains includes the resource group index of the synchronization signal classification to which the synchronization signal bound to the physical broadcast channel pertains.

It is to be noted that various modules described above may be implemented by software or hardware. Implementation by hardware may, but may not necessarily, be performed in the following manners: various modules described above are located in the same processor; or various modules described above may be arbitrarily combined and are located in different processors.

An embodiment of the present disclosure further provides a storage medium. Optionally, in this embodiment, the storage medium may be configured to store program codes for executing steps described above.

Optionally, in this embodiment, the storage medium may include, but is not limited to, a U disk, a read-only memory (ROM), a random access memory (RAM), a mobile hard disk, a magnetic disk, an optical disk or another medium capable of storing program codes.

Optionally, in this embodiment, a processor is configured to execute steps described above according to the program codes stored in the storage medium.

Optionally, for specific examples in this embodiment, reference may be made to the examples described in the above embodiments and optional implementation modes, and repetition will not be made in this embodiment.

An embodiment of the present disclosure further provides a processor. The processor is configured to execute programs, where, when executed, the programs are used for executing the above-mentioned method.

Apparently, those skilled in the art should understand that the modules or steps described above of the present disclosure may be implemented by a general-purpose computing device, the modules or steps may be integrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

As described above, the method and apparatus for transmitting a synchronization signal and the method and apparatus for receiving a synchronization signal provided by the embodiments of the present disclosure can achieve the following effect: compared with the related art where performance of the synchronization and coverage of the synchronization signal are affected due to low flexibility of the synchronization, the flexibility of the synchronization is improved, thereby reducing effects on performance of the synchronization and coverage of the synchronization signal.

What is claimed is:

1. A method for transmitting a synchronization signal, comprising:
    determining, by a transmitting end, the synchronization signal;
    transmitting, by the transmitting end, the synchronization signal determined to a receiving end, and notifying, by the transmitting end, the receiving end of configuration information related to the synchronization signal determined;

wherein the determining, by a transmitting end, the synchronization signal comprises: determining, by the transmitting end, X synchronization signal groups, wherein each of the X synchronization signal groups comprises a respective one of $N_1, N_2, \ldots N_x$ types of downlink synchronization signals corresponding to transmission configuration, X is an integer greater than or equal to 1, $N_1, N_2, \ldots N_x$ are all integers greater than or equal to 1 and a sum $N_{tot}$ of a total number of classifications of the downlink synchronization signals included in the X synchronization signal groups equals to $N_1+N_2+ \ldots +N_x$;

the notifying, by the transmitting end, the receiving end of configuration information related to the synchronization signal determined comprises: determining, by the transmitting end, M physical broadcast channels; notifying, by the transmitting end, the receiving end of the configuration information related to the synchronization signal determined through the M physical broadcast channels; wherein each of the M physical broadcast channels is bound to a respective one of $N_{tot}$ types of the downlink synchronization signals, M is a positive integer less than or equal to $N_{tot}$; or the M physical broadcast channels are bound to part or all of the synchronization signals among the $N_{tot}$ types of the downlink synchronization signals;

in the case that the configuration information related to the synchronization signal determined is notified to the receiving end by the transmitting end in the manner of being indicated by the sequence group to which the sequence of the synchronization signal belongs, at least one of the followings is met:

it is promised by the transmitting end and the receiving end that available sequences of the synchronization signals are divided into Y sequence groups, wherein Y is a natural number greater than 1, wherein an index of each of the Y sequence groups is used for indicating at least one of the followings: the resource allocation information about a synchronization signal classification and/or a synchronization signal group to which the synchronization signal belongs; the resource configuration information about the X synchronization signal groups; and at least one parameter of a group consisting of: $N_{tot}, N_1, N_2, \ldots N_x$ and X;

it is promised by the transmitting end and the receiving end that the number of repetitions of the sequence of the synchronization signals is adopted for indicating at least one the followings: the resource allocation information about the synchronization signal classification and/or synchronization signal group to which the synchronization signal belongs; the resource allocation information about the X synchronization signal groups; and at least one parameter of a group consisting of: $N_{tot}, N_1, N_2, \ldots N_x$ and X;

in the case that the configuration information related to the synchronization signal determined is notified to the receiving end by the transmitting end in the manner of being indicated by the frequency domain mapping of the synchronization signal, features about the number of sub-carriers in the frequency domain mapping and/or positions of the sub-carriers are adopted for indicating at least one of the followings:

the resource allocation information about the synchronization signal group corresponding to the synchronization signal; the resource allocation information about the X synchronization signal groups; and at least one parameter of a group consisting of: $N_{tot}, N_1, N_2, \ldots N_x$ and X; and in the case that the configuration information related to the synchronization signal determined is notified to the receiving end by the transmitting end in the manner of being indicated by the time domain mapping of the synchronization signal, a parameter about a transmitting time interval of the same type of synchronization signal in the time domain is adopt for indicating at least one of the followings:

the resource allocation information about the synchronization signal group corresponding to the synchronization signal; the resource allocation information about the X synchronization signal groups; and at least one parameter of a group consisting of: $N_{tot}, N_1, N_2, \ldots N_x$ and X.

2. The method according to claim 1, wherein the notifying, by the transmitting end, the receiving end of configuration information related to the synchronization signal determined comprises:

notifying, by the transmitting end, the receiving end of the configuration information related to the synchronization signal determined in at least one of the following manners:

indicating the configuration information through signaling in a physical broadcast channel;

indicating the configuration information through higher layer configuration signaling;

indicating the configuration information through a sequence group to which a sequence of the synchronization signal belongs;

indicating the configuration information through signaling on another cell other than a cell corresponding to the synchronization signal;

indicating the configuration information through signaling on another sector other than a sector corresponding to the synchronization signal;

indicating the configuration information through signaling on another carrier frequency other than a carrier frequency corresponding to the synchronization signal;

indicating the configuration information through signaling on a transmission node other than the transmitting end;

indicating the configuration information through a frequency domain mapping of the synchronization signal; or indicating the configuration information through a time domain mapping of the synchronization signal.

3. The method according to claim 1, wherein the transmitting, by the transmitting end, the synchronization signal determined to a receiving end comprises:

determining, by the transmitting end, a transmission resource set corresponding to the synchronization signal; and transmitting, by the transmitting end, the synchronization signal through a resource in the transmission resource set determined.

4. The method according to claim 3, wherein in the transmitting, by the transmitting end, the synchronization signal through a resource in the transmission resource set determined, at least one of the following resources is adopted for transmitting the synchronization signals corresponding to the same transmission configuration:
the same sequence resource; the same time domain resource; the same beam resource; the same frequency domain resource or the power resource of the same size.

5. The method according to claim 1, wherein in the notifying, by the transmitting end, the receiving end of the configuration information related to the synchronization signal determined through the M physical broadcast channels, at least one of the following information is notified, by the transmitting end, to the receiving end through the M physical broadcast channels:
resource allocation information about a synchronization signal group to which the synchronization signal bound to the physical broadcast channel belongs;
resource allocation information about the X synchronization signal groups;
an index of the synchronization signal group to which the synchronization signal bound to the physical broadcast channel belong;
an index of a resource group corresponding to the synchronization signal bound to the physical broadcast channel; or
basic configuration information about the synchronization signal determined, wherein the basic configuration information comprises at least one parameter of a group consisting of: $N_{tot}$, $N_1$, $N_2$, ... $N_x$ and X.

6. A method for receiving a synchronization signal, comprising:
receiving, by a receiving end, configuration information transmitted from a transmitting end, wherein the configuration information is related to the synchronization signal transmitted from the transmitting end; and
receiving the synchronization signal transmitted from the transmitting end by the receiving end according to the configuration information;
wherein the synchronization signal comprises X synchronization signal groups, wherein each group of the X synchronization signal groups comprises a respective one of $N_1$, $N_2$, ... $N_x$ types of downlink synchronization signals corresponding to transmission configuration, wherein X is an integer greater than or equal to 1, $N_1$, $N_2$, ... $N_x$ are all integers greater than or equal to 1, and a sum $N_{tot}$ of types of the downlink synchronization signals included in the X synchronization signal groups equals to $N_1+N_2+ ... +N_x$;
receiving, by a receiving end, configuration information transmitted from a transmitting end comprises: acquiring the configuration information by the receiving end through M physical broadcast channels; wherein each of the M physical broadcast channels is bound to a respective one of $N_{tot}$ types of the downlink synchronization signals, M is a positive integer less than or equal to $N_{tot}$; or the M physical broadcast channels are bound to part or all of the synchronization signals among the $N_{tot}$ types of the downlink synchronization signals;
in response to determining that the configuration information is determined by the receiving end according to the information about the sequence group to which the sequence of the synchronization signal detected belongs, at least one of the followings is met:
dividing, by the transmitting end and the receiving end, the available sequences of the synchronization signals into Y sequence groups, wherein Y is a natural number greater than 1, wherein an index of each of the Y sequence groups is used for indicating at least one of the following: the resource allocation information about a synchronization signal classification and/or a synchronization signal group to which the synchronization signal belongs; the resource configuration information about the X synchronization signal groups; or at least one parameter of a group consisting of: $N_{tot}$, $N_1$, $N_2$, ... $N_x$ and X;
adopting, by the transmitting end and the receiving end, the number of repetitions of the sequence of the synchronization signals for indicating at least one the followings: the resource allocation information about the synchronization signal classification and/or synchronization signal group to which the synchronization signal belongs; the resource allocation information about the X synchronization signal groups; or at least one parameter of a group consisting of: $N_{tot}$, $N_1$, $N_2$, ... $N_x$ and X;
in response to determining that the configuration information is determined by the receiving end according to the frequency domain mapping manner of the synchronization signal, at least one of the followings are determined by the receiving end according to features about the number of sub-carriers in the frequency domain mapping and/or positions of the sub-carriers:
the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X; or
in response to determining that the configuration information is determined by the receiving end according to the time domain mapping manner of the synchronization signal, at least one of the followings are determined by the receiving end according to a parameter about a transmitting time interval of the same type of synchronization signal in the time domain:
the resource allocation information about the synchronization signal group corresponding to the synchronization signal; the resource allocation information about the X synchronization signal groups; or at least one parameter of a group consisting of: $N_{tot}$, $N_1$, $N_2$, ... $N_x$ and X.

7. The method according to claim 6, wherein in the receiving, by a receiving end, configuration information transmitted from a transmitting end, the configuration information is received and determined by the receiving end through at least one of the following manners:
determining the configuration information by the receiving end according to information about a sequence group to which sequence of synchronization signal detected belong;
determining the configuration information by the receiving end according to a frequency domain mapping manner of the synchronization signals detected;
determining the configuration information by the receiving end according to a time domain mapping manner of the synchronization signals detected;
acquiring the configuration information by the receiving end through signaling in a physical broadcast channel; or
acquiring the configuration information by the receiving end according to higher layer configuration signaling.

8. The method according to claim 7, wherein in response to determining that the physical broadcast channel is bound to the one or more of the synchronization signal groups, the signaling in the physical broadcast channel is further used for indicating at least one of the followings:

the resource allocation information about the synchronization signal group to which the synchronization signal bound to the physical broadcast channel belongs; and an index of the synchronization signal group to which the synchronization signal bound to the physical broadcast channel belongs.

9. The method according to claim 8, wherein the resource allocation information about the synchronization signal group to which the synchronization signal bound to the physical broadcast channel belongs comprises a resource group index of the synchronization signal group to which the synchronization signal bound to the physical broadcast channel belongs.

10. The method according to claim 7, wherein in response to determining that the physical broadcast channel is bound to one or more types of the synchronization signal, the signaling in the physical broadcast channel is further used for indicating at least one of the followings:

the resource allocation information about a synchronization signal classification to which the synchronization signal bound to the physical broadcast channel pertains; or an index of the synchronization signal classification to which the synchronization signal bound to the physical broadcast channel pertains.

11. The method according to claim 6, wherein the configuration information comprises at least one of basic configuration information and resource configuration information, wherein at least one of the followings is met in the method:

the basic configuration information comprises at least one parameter of a group consisting of: $N_{tot}$, $N_1$, $N_2$, ... $N_x$ and X;

the resource configuration information comprises at least one parameter of a group consisting of: a sequence resource allocation parameter, a beam resource allocation parameter, a time domain resource parameter, a frequency domain resource parameter, a power resource parameter and a transmission sector resource parameter;

the resource configuration information comprises index information about a resource group occupied by the synchronization signal;

the resource configuration information comprises resource allocation information about part or all of the synchronization signal groups; or the resource configuration information comprises resource allocation information about one or more types of the synchronization signals.

12. An apparatus for transmitting a synchronization signal, applied to a transmitting end, comprising a processor and a storage device for storing computer executable instructions that when executed by the processor cause the processor:

determine the synchronization signal; and transmit the synchronization signal determined to a receiving end, and notify the receiving end of configuration information related to the synchronization signal determined;

wherein determine the synchronization signal comprises:

the synchronization signal comprises X synchronization signal groups, wherein each group of the X synchronization signal groups comprises a respective one of $N_1$, $N_2$, ... $N_x$ types of downlink synchronization signals corresponding to transmission configuration, wherein X is an integer greater than or equal to 1, $N_1$, N2, ... $N_x$ are all integers greater than or equal to 1, and a sum $N_{tot}$ of types of the downlink synchronization signals included in the X synchronization signal groups equals to $N_1+N_2+ ... +N_x$;

notify the receiving end of configuration information related to the synchronization signal determined comprises: determine M physical broadcast channels; notify the receiving end of the configuration information related to the synchronization signal determined through the M physical broadcast channels; wherein each of the M physical broadcast channels is bound to a respective one of $N_{tot}$ types of the downlink synchronization signals, M is a positive integer less than or equal to $N_{tot}$; or the M physical broadcast channels are bound to part or all of the synchronization signals among the $N_{tot}$ types of the downlink synchronization signals;

in the case that the configuration information related to the synchronization signal determined is notified to the receiving end by the transmitting end in the manner of being indicated by the sequence group to which the sequence of the synchronization signal belongs, at least one of the followings is met:

it is promised by the transmitting end and the receiving end that available sequences of the synchronization signals are divided into Y sequence groups, wherein Y is a natural number greater than 1, wherein an index of each of the Y sequence groups is used for indicating at least one of the followings: the resource allocation information about a synchronization signal classification and/or a synchronization signal group to which the synchronization signal belongs; the resource configuration information about the X synchronization signal groups; and at least one parameter of a group consisting of: $N_{tot}$, $N_1$, $N_2$, ... $N_x$ and X;

it is promised by the transmitting end and the receiving end that the number of repetitions of the sequence of the synchronization signals is adopted for indicating at least one the followings: the resource allocation information about the synchronization signal classification and/or synchronization signal group to which the synchronization signal belongs; the resource allocation information about the X synchronization signal groups; and at least one parameter of a group consisting of: $N_{tot}$, $N_1$, $N_2$, ... $N_x$ and X;

in the case that the configuration information related to the synchronization signal determined is notified to the receiving end by the transmitting end in the manner of being indicated by the frequency domain mapping of the synchronization signal, features about the number of sub-carriers in the frequency domain mapping and/or positions of the sub-carriers are adopted for indicating at least one of the followings:

the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X; and in the case that the configuration information related to the synchronization signal determined is notified to the receiving end by the transmitting end in the manner of being indicated by the time domain mapping of the synchronization signal, a parameter about a transmitting time interval of the same type of synchronization signal in the time domain is adopt for indicating at least one of the followings:

the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X.

13. The apparatus according to claim 12, wherein the operations further cause the processor to:

receive configuration information transmitted from a transmitting end, wherein the configuration information is related to the synchronization signal transmitted from the transmitting end; and receive the synchronization signal transmitted from the transmitting end according to the configuration information;

wherein the synchronization signal comprises X synchronization signal groups, wherein each group of the X synchronization signal groups comprises a respective one of $N_1$, $N_2$, ... $N_x$ types of downlink synchronization signals corresponding to transmission configuration, wherein X is an integer greater than or equal to 1, $N_1$, N2, ... $N_x$ are all integers greater than or equal to 1, and a sum $N_{tot}$ of types of the downlink synchronization signals included in the X synchronization signal groups equals to $N_1+N_2+ ... +N_x$;

receive configuration information transmitted from a transmitting end comprises: acquire the configuration information through M physical broadcast channels; wherein each of the M physical broadcast channels is bound to a respective one of $N_{tot}$ types of the downlink synchronization signals, M is a positive integer less than or equal to $N_{tot}$; or the M physical broadcast channels are bound to part or all of the synchronization signals among the $N_{tot}$ types of the downlink synchronization signals;

in response to determining that the configuration information is determined by the receiving end according to the information about the sequence group to which the sequence of the synchronization signal detected belongs, at least one of the followings is met:

dividing, by the transmitting end and the receiving end, the available sequences of the synchronization signals into Y sequence groups, wherein Y is a natural number greater than 1, wherein an index of each of the Y sequence groups is used for indicating at least one of the following: the resource allocation information about a synchronization signal classification and/or a synchronization signal group to which the synchronization signal belongs; the resource configuration information about the X synchronization signal groups; or at least one parameter of a group consisting of: $N_{tot}$, $N_1$, $N_2$, ... $N_x$ and X;

adopting, by the transmitting end and the receiving end, the number of repetitions of the sequence of the synchronization signals for indicating at least one the followings: the resource allocation information about the synchronization signal classification and/or synchronization signal group to which the synchronization signal belongs; the resource allocation information about the X synchronization signal groups; or at least one parameter of a group consisting of: $N_{tot}$, $N_1$, $N_2$, ... $N_x$ and X;

in response to determining that the configuration information is determined by the receiving end according to the frequency domain mapping manner of the synchronization signal, at least one of the followings are determined by the receiving end according to features about the number of sub-carriers in the frequency domain mapping and/or positions of the sub-carriers:

the resource allocation information about the synchronization signal group corresponding to the synchronization signal; the resource allocation information about the X synchronization signal groups; and at least one parameter of a group consisting of: $N_{tot}$, $N_1$, $N_2$, ... $N_x$ and X; or in response to determining that the configuration information is determined by the receiving end according to the time domain mapping manner of the synchronization signal, at least one of the followings are determined by the receiving end according to a parameter about a transmitting time interval of the same type of synchronization signal in the time domain:

the resource allocation information about the synchronization signal group corresponding to the synchronization signal; the resource allocation information about the X synchronization signal groups; or at least one parameter of a group consisting of: $N_{tot}$, $N_1$, $N_2$, ... $N_x$ and X.

* * * * *

UNITED STATES PATENT AND TRADEMARK OFFICE
CERTIFICATE OF CORRECTION

PATENT NO. : 11,071,090 B2
APPLICATION NO. : 16/312930
DATED : July 20, 2021
INVENTOR(S) : Zhaohua Lu et al.

It is certified that error appears in the above-identified patent and that said Letters Patent is hereby corrected as shown below:

In the Specification

In Column 1, Line 62, delete "subcarriers" and insert --sub-carriers--.

In Column 1, Line 64, delete "subcarriers" and insert --sub-carriers--.

In Column 1, Line 65, delete "subcarriers" and insert --sub-carriers--.

In Column 2, Line 2, delete "subframe" and insert --sub-frame--.

In Column 3, Line 22, delete "Ntot" and insert --$N_{tot}$--.

In Column 3, Line 60, delete "Ntot," and insert --$N_{tot}$,--.

In Column 12, Line 2, delete "$N_X$" and insert --$N_x$--.

In Column 13, Line 12, delete "$N_X$" and insert --$N_x$--.

In Column 13, Line 33 (Approx.), delete "$N_X$" and insert --$N_x$--.

In Column 15, Line 47, delete "Ntot)." and insert --$N_{tot}$).--.

In Column 16, Line 22, delete "$N_X$" and insert --$N_x$--.

In Column 16, Line 43, delete "$N_X$" and insert --$N_x$--.

In Column 16, Line 66, delete "$N_X$" and insert --$N_x$--.

In Column 17, Line 25, delete "an the".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,071,090 B2

In Column 17, Line 33, delete "$N_X$" and insert --$N_x$--.

In Column 17, Line 62, delete "$N_X$" and insert --$N_x$--.

In Column 18, Line 4, delete "$N_X$" and insert --$N_x$--.

In Column 18, Line 16, delete "$N_X$" and insert --$N_x$--.

In Column 18, Line 28, delete "$N_X$" and insert --$N_x$--.

In Column 18, Line 60, delete "$N_X$" and insert --$N_x$--.

In Column 18, Line 62, delete "$N_X$" and insert --$N_x$--.

In Column 18, Line 65, delete "$N_X$" and insert --$N_x$--.

In Column 20, Line 15, delete "$N_X$" and insert --$N_x$--.

In Column 21, Line 6, delete "$N_X$" and insert --$N_x$--.

In Column 21, Line 16 (Approx.), delete "$N_X$" and insert --$N_x$--.

In Column 21, Line 28, delete "$N_X$" and insert --$N_x$--.

In Column 21, Line 40, delete "$N_X$" and insert --$N_x$--.

In Column 23, Line 27, delete "$N_X$" and insert --$N_x$--.

In Column 23, Line 49, delete "$N_X$" and insert --$N_x$--.

In Column 24, Line 42, delete "$N_X$" and insert --$N_x$--.

In Column 25, Line 4, delete "$N_X$" and insert --$N_x$--.

In Column 25, Line 13, delete "$N_X$" and insert --$N_x$--.

In Column 25, Line 26, delete "$N_X$" and insert --$N_x$--.

In Column 25, Line 39, delete "$N_X$" and insert --$N_x$--.

In Column 25, Line 58, delete "$N_X$" and insert --$N_x$--.

In Column 25, Line 60, delete "$N_X$" and insert --$N_x$--.

In Column 25, Line 63, delete "$N_X$" and insert --$N_x$--.

CERTIFICATE OF CORRECTION (continued)
U.S. Pat. No. 11,071,090 B2

In Column 26, Line 60, delete "$N_X$" and insert --$N_x$--.

In Column 27, Line 3, delete "$N_X$" and insert --$N_x$--.

In Column 27, Line 15, delete "$N_X$" and insert --$N_x$--.

In Column 27, Line 27, delete "$N_X$" and insert --$N_x$--.

In the Claims

In Column 29, Claim 1, Line 36, delete "followings" and insert --following--.

In Column 29, Claim 1, Line 42, delete "followings" and insert --following--.

In Column 29, Claim 1, Line 47, delete "and" and insert --or--.

In Column 29, Claim 1, Line 53, delete "followings" and insert --following--.

In Column 29, Claim 1, Line 58, delete "and" and insert --or--.

In Column 29, Claim 1, Line 67, delete "followings" and insert --following--.

In Column 30, Claim 1, Line 14 (Approx.), delete "followings" and insert --following--.

In Column 30, Claim 1, Line 19, delete "and" and insert --or--.

In Column 31, Claim 5, Line 21, delete "belong;" and insert --belongs;--.

In Column 31, Claim 6, Line 63, delete "followings" and insert --following--.

In Column 32, Claim 6, Line 12, delete "followings" and insert --following--.

In Column 32, Claim 6, Line 22, delete "followings are" and insert --following is--.

In Column 32, Claim 6, Line 29, delete "and" and insert --or--.

In Column 32, Claim 6, Line 35, delete "followings are" and insert --following is--.

In Column 33, Claim 8, Line 2, delete "followings" and insert --following--.

In Column 33, Claim 8, Line 5, delete "and" and insert --or--.

In Column 33, Claim 10, Line 20, delete "followings" and insert --following--.

In Column 33, Claim 11, Line 31, delete "followings" and insert --following--.

CERTIFICATE OF CORRECTION (continued)
U.S. Pat. No. 11,071,090 B2

In Column 34, Claim 12, Line 25, delete "followings" and insert --following--.

In Column 34, Claim 12, Line 31, delete "followings" and insert --following--.

In Column 34, Claim 12, Line 36, delete "and" and insert --or--.

In Column 34, Claim 12, Line 42, delete "followings" and insert --following--.

In Column 34, Claim 12, Line 47, delete "and" and insert --or--.

In Column 34, Claim 12, Line 56, delete "followings" and insert --following--.

In Column 34, Claim 12, Line 60, delete "and" and insert --or--.

In Column 34, Claim 12, Line 62, delete "and" and insert --or--.

In Column 35, Claim 12, Line 3, delete "followings" and insert --following--.

In Column 35, Claim 12, Line 7 (Approx.), delete "and" and insert --or--.

In Column 36, Claim 13, Line 12 (Approx.), delete "followings" and insert --following--.

In Column 36, Claim 13, Lines 23-24 (Approx.), delete "followings are" and insert --following is--.

In Column 36, Claim 13, Line 37, delete "followings are" and insert --following is--.

In Column 33, Claim 8, Line 2, delete "followings:" and insert --following:--.

In Column 33, Claim 8, Line 5, delete "belongs; and" and insert --belongs; or--.

In Column 33, Claim 10, Line 20, delete "followings:" and insert --following:--.